United States Patent
Ishikawa et al.

(10) Patent No.: US 8,278,794 B2
(45) Date of Patent: Oct. 2, 2012

(54) AXIAL GAP TYPE MOTOR AND METHOD OF MANUFACTURING ROTOR OF MOTOR

(75) Inventors: Satoshi Ishikawa, Saitama (JP); Keiichi Yamamoto, Saitama (JP); Shoei Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 12/918,638

(22) PCT Filed: Oct. 29, 2009

(86) PCT No.: PCT/JP2009/068626
§ 371 (c)(1),
(2), (4) Date: Aug. 20, 2010

(87) PCT Pub. No.: WO2010/064510
PCT Pub. Date: Jun. 10, 2010

(65) Prior Publication Data
US 2010/0320858 A1 Dec. 23, 2010

(30) Foreign Application Priority Data

Dec. 3, 2008 (JP) ................................ 2008-308689
Feb. 6, 2009 (JP) ................................ 2009-026199

(51) Int. Cl.
*H02K 1/27* (2006.01)
(52) U.S. Cl. ......... 310/156.35; 310/156.43; 310/156.48; 310/156.55; 310/156.64; 310/156.65
(58) Field of Classification Search ............. 310/156.08, 310/156.32–156.38, 156.43, 156.48, 156.55, 310/156.59, 156.62–156.65, 216.003, 216.007–216.008, 310/266–268
See application file for complete search history.

(56) References Cited

U.S. PATENT DOCUMENTS

| | | | |
|---|---|---|---|
| 6,211,584 B1 * | 4/2001 | Kurosawa et al. | 310/45 |
| 6,392,324 B1 * | 5/2002 | Kuwahara | 310/156.11 |
| 7,187,098 B2 * | 3/2007 | Hasebe et al. | 310/156.43 |
| 7,679,260 B2 * | 3/2010 | Yamamoto et al. | 310/268 |
| 7,906,883 B2 * | 3/2011 | Abe | 310/156.64 |
| 7,919,897 B2 * | 4/2011 | Tajima et al. | 310/216.016 |
| 8,040,008 B2 * | 10/2011 | Kawamura et al. | 310/156.32 |
| 8,049,389 B2 * | 11/2011 | Abe et al. | 310/156.62 |
| 8,053,942 B2 * | 11/2011 | Abe et al. | 310/156.64 |
| 2011/0273034 A1 * | 11/2011 | Yamamoto | 310/44 |

FOREIGN PATENT DOCUMENTS

JP        62-110466 A        5/1987
(Continued)

OTHER PUBLICATIONS

International Search Report of PCT/JP2009/068626, date of mailing Dec. 15, 2009.

*Primary Examiner* — Tran Nguyen
(74) *Attorney, Agent, or Firm* — Westerman, Hattori, Daniels & Adrian, LLP

(57) ABSTRACT

The rotor 11 of an axial gap type motor 10 is provided with a plurality of main magnets 41 respectively magnetized in an axial direction of a rotational axis and disposed at predetermined intervals in a peripheral direction, a plurality of yokes 42 structured by a laminated member 71 produced by winding a tape-shaped electromagnetic steel plate 60 and respectively disposed on both sides of the main magnets 41 in the axial direction, and a rotor frame 30 made of a die-cast alloy and including a plurality of ribs 31 respectively interposed between the main magnets 41 adjoining each other in the peripheral direction and extending in the radial direction, and an inner cylindrical portion 32 and an outer cylindrical portion 33 respectively formed on the radially inner side of the ribs 31 and on the radially outer side of the ribs 31. According to this structure, the yokes structured by the wound laminated member and the rotor frame can be firmly unified with each other, thereby being able to secure such rigidity that can withstand a centrifugal force generated due to the rotation of the rotor and a magnetic suction force given from the stator.

14 Claims, 28 Drawing Sheets

FOREIGN PATENT DOCUMENTS

| | | |
|---|---|---|
| JP | 2-174538 A | 7/1990 |
| JP | 2002-10537 A | 1/2002 |
| JP | 2005-168124 A | 6/2005 |
| JP | 2006-50706 A | 2/2006 |
| JP | 2006-166626 A | 6/2006 |
| JP | 2006-166635 A | 6/2006 |
| JP | 2007-49787 A | 2/2007 |
| JP | 2008-187841 A | 8/2008 |
| JP | 2008-271640 A | 11/2008 |
| JP | 2008-278648 A | 11/2008 |

* cited by examiner

AXIAL GAP TYPE MOTOR AND METHOD OF MANUFACTURING ROTOR OF MOTOR

TECHNICAL FIELD

The present invention relates to an axial gap type motor and a method of manufacturing a rotor of the motor.

BACKGROUND ART

Conventionally, there is known an axial gap type motor which includes, for example, a rotor rotatable about a rotary axis and a stator disposed to be opposed to the rotor at least from one side in an axial direction, and also in which, with respect to a magnetic flux that is generated by a permanent magnet of the rotor, there is formed a magnetic flux loop through the stator.

As a method for manufacturing a rotor, there are proposed various methods in which a rotor core is made of a laminated member produced by winding an electromagnetic steel plate (see, for example, Patent References 1 to 4). As shown in FIG. 30, in an axial gap type motor disclosed in the Patent Reference 1, a laminated member 201, which is produced by winding a tape-shaped electromagnetic steel plate, is used to structure a rotor core 202, and magnets 204 are respectively stored in openings 203 formed in the rotor core 202, whereby a plurality of yokes are formed in the rotor core 202 integrally therewith.

[Prior Art Technology Reference]
[Patent Reference]
[Patent Reference 1]JP-A-2006-166635 (FIG. 2)
[Patent Reference 2]JP-A-2005-168124 (FIG. 1)
[Patent Reference 3]JP-A-2002-010537 (FIG. 1)
[Patent Reference 4]JP-A-2006-050706 (FIGS. 2, 6 and 7)

SUMMARY OF INVENTION

Problems that the Invention is to Solve

Here, an inside portion of the rotor core formed of a laminated member is mounted on a shaft or on a rotor frame. When assembling the rotor core and the shaft or the rotor frame to each other while securing a rigidity thereof, an assembling structure thereof is liable to be complicated when compared with a rotor structure which includes yokes divided from each other. Also, rotor manufacturing methods respectively disclosed in the Patent Reference 1 to 3 do not specifically describe how to mount the rotor core onto the rotor shaft. Further, in a method disclosed in the Patent Reference 4, a shaft is divided into two, there are formed screw portions in outer peripheral surfaces of the divided shafts, and the rotor core and the divided shafts are fixed to each other using nuts. This manner of mounting is very complicated.

The present invention aims at solving the above problems found in the prior art technology. It is an object of the invention to provide an axial gap type motor which can firmly unify together yokes structured by a wound laminated member and a rotor frame, and also can secure such rigidity as can withstand a centrifugal force given due to a rotation of a rotor and a magnetic suction force given from a stator, and a method of manufacturing a rotor of the motor. Also, it is an another object of the invention to provide an axial gap type motor which, when fixing yokes structured by a wound laminated member to a shaft through a rotor frame, can firmly fix the rotor frame and the shaft to each other, and a method of manufacturing the rotor of the motor.

Means for Solving the Problems

In attaining the above object, according to an embodiment of the invention there is provided an axial gap type motor (for example, an axial gap type motor 10 which will be discussed in the following embodiments of the invention), comprising: a rotor (for example, a rotor 11 which will be discussed in the following embodiments) rotatable around a rotational axis; and, a stator (for example, a stator 12 which will be discussed in the following embodiments) disposed to be opposed to the rotor at least from one side in an axial direction. In the present axial gap type motor, the rotor includes: a plurality of main magnets (for example, main magnets 41 which will be discussed in the following embodiments) respectively magnetized in the axial direction and disposed at predetermined intervals in a peripheral direction of the rotor; a plurality of yokes (for example, yokes 42 which will be discussed in the following embodiments) structured by a laminated member (for example, a laminated member 71 which will be discussed in the following embodiments) produced by winding a tape-shaped electromagnetic steel plate and disposed at least on said one side of the main magnets in the axial direction; and, a rotor frame (for example, a rotor frame 30 which will be discussed in the following embodiments) which is made of a die-cast alloy, and also which includes a plurality of ribs (for example, ribs 31 which will be discussed in the following embodiments) respectively interposed between the main magnets adjoining each other in the peripheral direction and extending in the radial direction, and at least one of an inner cylindrical portion (for example, an inner cylindrical portion 32 which will be discussed in the following embodiments) and an outer cylindrical portion (for example, an outer cylindrical portion 33 which will be discussed in the following embodiments), while the inner and outer cylindrical portions are respectively disposed on a radially inner side and on a radially outer side of the ribs.

According to an embodiment of the invention in addition to the structure of the invention set forth above, in the inner and outer cylindrical portions of the rotor frame, there are formed step portions (for example, step portions 36 and 37 which will be discussed in the following embodiments) to which a winding start portion and a winding end portion of the laminated member are to be respectively fixed, and inner and outer peripheral surfaces of the laminated member structuring the plurality of yokes are respectively situated substantially on a concentric circle.

According to an embodiment of the invention in addition to the structure of the invention as set forth above, the motor further includes a shaft (for example, a shaft 55 which will be discussed in the following embodiments) which is capable of transmitting power given from the rotor and also which includes a shaft side mounting hole (for example, a shaft side mounting hole 57 which will be discussed in the following embodiments) formed in the outer peripheral surface of the shaft. And, the rotor frame includes an inward projection (for example, an inward projection 34 which will be discussed in the following embodiments) which enters into the shaft side mounting hole of the shaft.

According to an embodiment of the invention in addition to the structure of the invention as set forth above, the shaft includes a flange (for example, a flange 56 which will be discussed in the following embodiments) the diameter of which increases toward the inner peripheral portion of the rotor frame.

According to an embodiment of the invention as set forth in addition to the structure as set forth above, the rotor further includes an outer ring (for example, an outer ring 50 which will be discussed in the following embodiments) in the outer peripheral surface of which there is formed a ring side mounting hole (for example, a ring side mounting hole 51 which will be discussed in the following embodiments). And, the rotor frame has an outward projection (for example, an outward projection 35 which will be discussed in the following embodiments) which enters into the ring side mounting hole of the outer ring.

According to an embodiment of the invention in addition to the structure of the invention, the laminated member includes a plurality of main magnet inserting holes (for example, main magnet inserting holes 72 which will be discussed in the following embodiments) into which the main magnets are respectively inserted. And, each of the main magnet inserting holes is formed such that its length in the axial direction is set substantially equal to that of the main magnet and its length in the peripheral direction is set larger than that of the main magnet.

According to an embodiment of the invention in addition to the structure of the invention as set forth above the rotor further includes a plurality of sub magnets (for example, sub magnets 43 which will be discussed in the following embodiments) which are respectively interposed between the yokes adjoining each other in the peripheral direction and are respectively disposed in their associated ones of the plurality of sub magnet storing portions (for example, sub magnet storing portions 74 which will be discussed in the following embodiments) of the laminated member, while the sub magnet storing portions are respectively formed inwardly of the axial side surfaces of the yokes and are respectively to be magnetized in directions perpendicular to the axial direction and radial direction. And, the rotor frame includes a sub magnet hold portion (for example, a sub magnet hold portion 39 which will be discussed in the following embodiments) which enters into a space formed on the axial direction outside of the sub magnets.

According to an embodiment of the invention in addition to the structure as set forth above, the rotor frame includes the plurality of ribs and the inner cylindrical portion; in the laminated member, there are formed a plurality of main magnet inserting holes for respectively inserting their associated main magnets thereinto and a plurality of rib storing holes (for example, rib storing holes 73 which will be discussed in the following embodiments) for respectively storing their associated ribs thereinto; and, the inner peripheral side of the main magnet inserting holes and the outer peripheral side of the rib storing holes are respectively closed.

According to an embodiment of the invention as set forth above there is provided a method of manufacturing a rotor of an axial gap type motor. Specifically, the motor is provided with: a rotor rotatable around a rotational axis; and, a pair of stators respectively mounted at least from one side in the axial direction and respectively disposed opposed to the rotor, the rotor including: a plurality of main magnets respectively magnetized in the axial direction and disposed at predetermined intervals in the peripheral direction of the rotor; a plurality of yokes respectively disposed at least on one side of the plurality of main magnets in the axial direction; and, a rotor frame including a plurality of ribs respectively interposed between the main magnets adjoining each other in the peripheral direction and respectively extending in the radial direction, and at least one of an inner cylindrical portion and an outer cylindrical portion respectively disposed on the radially inner side and on the radially outer side of the plurality of ribs. The rotor manufacturing method includes: the step of winding a tape-shaped electromagnetic steel plate to thereby produce a laminated member which is used to form the plurality of yokes; and, the step of, in a state where the laminated member is positioned with respect to molds (for example, first and second molds 80 and 81 which will be discussed in the following embodiments), casting a die-cast alloy into the molds to thereby form the rotor frame.

According to an embodiment of the invention in addition to the structure as set forth above, in the frame forming step, in the inner and outer cylindrical portions of the rotor frame, there are formed step portions to which the winding start portion and winding end portion of the laminated member are to be fixed, and the inner and outer peripheral surfaces of the laminated member structuring the plurality of yokes are respectively situated substantially on a concentric circle.

According to an embodiment of the invention in addition to the structure as set forth above, the motor further includes a shaft capable of transmitting power given from the rotor and including a shaft side mounting hole formed in the outer peripheral surface of the shaft. And, in the frame forming step, the rotor frame is cast in such a manner that the die-cast alloy is poured into the shaft side mounting hole of the shaft.

According to an embodiment of the invention in addition to the structure as set forth above, the shaft includes a flange the diameter of which increases toward the inner peripheral portion of the rotor frame.

According to an embodiment of the invention in addition to the structure as set forth above, the rotor further includes an outer ring in the inner peripheral surface of which there is formed a ring side mounting hole. And, in the frame forming step, the rotor frame is cast in such a manner that the die-cast alloy is poured into the ring side mounting hole of the outer ring.

According to an embodiment of the invention in addition to the structure as set forth above, in the frame forming step, the rotor frame is cast in a state where the plurality of main magnets are respectively inserted into the laminated member.

According to an embodiment of the invention in addition to the structure as set forth above, the laminated member includes a plurality of main magnet inserting holes into which the plurality of main magnets can be respectively inserted, and the main magnet inserting holes are formed such that their length in the axial direction is set substantially equal to that of the main magnets and their length in the peripheral direction is set larger than that of the main magnets.

According to an embodiment of the invention in addition to the structure as set forth above, the rotor further includes a plurality of sub magnets respectively interposed between the yokes adjoining each other in the peripheral direction and respectively disposed in their associated ones of the plurality of sub magnet storing portions of the laminated member respectively formed inwardly of the axial side surfaces of the yokes. And, in the frame forming step, the rotor frame is cast in such a manner that, in a state where the plurality of sub magnets are respectively inserted into the laminated member, the die-cast alloy is poured into a space formed in the axially outside portion of each sub magnets.

According to an embodiment of the invention in addition to the structure as set forth above, the laminated member includes main magnet inserting holes respectively for inserting their associated main magnets thereinto and rib storing holes respectively for storing the ribs thereinto, and the inner peripheral sides of the main magnet inserting holes and the outer peripheral sides of the rib storing holes are respectively closed. Also, in the frame forming step, there is formed the rotor frame including the plurality of ribs and the inner cylindrical portion, and the main magnets are respectively inserted into the laminated member with which the rotor frame has been unified.

According to an embodiment of the invention in addition to the structure as set forth above, the molds, which are used to cast the rotor frame, respectively include step portions (for example, step portions 82 and 83 which will be discussed in the following embodiments) which are respectively used to position the yokes in the radial direction.

According to an embodiment of the invention in addition to the structure as set forth above, the rotor frame is cast in a state where the laminated member is positioned in the peripheral direction by the winding start portion and winding end portion thereof.

Also, in attaining the second object of the invention, according to an embodiment of the invention there is provided an axial gap type motor (for example, an axial gap type motor 10 which will be discussed in the following embodiments) provided with: a rotor (for example, a rotor 11 which will be discussed in the following embodiments) rotatable around a rotational axis; a stator (for example, a stator 12 which will be discussed in the following embodiments) disposed from at least one side in the axial direction in such a manner that it is opposed to the rotor; and, a shaft (for example, a shaft 90 which will be discussed in the following embodiments)for transmitting power given from the rotor. The rotor includes: a plurality of main magnets (for example, main magnets 41 which will be discussed in the following embodiments) respectively magnetized in the axial direction and disposed at predetermined intervals in the peripheral direction of the rotor; a plurality of yokes (for example, yokes 42 which will be discussed in the following embodiments) which are respectively formed of a laminated member (for example, a laminated member 71 which will be discussed in the following embodiments) that has been produced by winding a tape-shaped electromagnetic steel plate and also which are disposed at least on one side of the plurality of main magnets in the axial direction; and, a rotor frame (for example, a rotor frame 30 which will be discussed in the following embodiments) which includes at least a plurality of ribs (for example, ribs 31 which will be discussed in the following embodiments) respectively interposed between the main magnets adjoining each other in the peripheral direction and extending in the radial direction, and an inner cylindrical portion (for example, an inner cylindrical portion 32 which will be discussed in the following embodiments) formed on the radially inner side of the plurality of ribs and connectable to the shaft, while the rotor frame is made of a die-cast alloy. And, the connecting surface between the inner cylindrical portion of the rotor frame and the shaft has a concavo-convex shape.

According to an embodiment of the invention in addition to the structure as set forth above, the shaft includes a flange (for example, a flange 91 which will be discussed in the following embodiments) the diameter of which increases toward the inner cylindrical portion of the rotor frame.

According to an embodiment of the invention in addition to the structure as set forth above, the outer peripheral portion of the flange includes a plurality of recessed portions (for example, recessed portions 92 which will be discussed in the following embodiments) formed substantially at regular intervals in the circumferential direction of the flange, and the inner cylindrical portion of the rotor frame includes, in the inner peripheral direction thereof, a plurality of projections (for example, projections 34 which will be discussed in the following embodiments) which can be respectively fitted into their associated a plurality of recessed portions.

According to an embodiment of the invention in addition to the structure as set forth above, the outer peripheral portion of the flange has a substantially gear-like shape due to the plurality of recessed portions and a plurality of arc surfaces (for example, arc surfaces 93 which will be discussed in the following embodiments) respectively formed between the recessed portions adjoining each other. And, the flange, in the intermediate portion thereof in the axial direction, forms the plurality of arc surfaces partially and also includes a disk portion (for example, a disk portion 95 which will be discussed in the following embodiments) having a plurality of partition walls (for example, partition walls 94 which will be discussed in the following embodiments) respectively for separating the recessed portions from each other.

According to an embodiment of the invention in addition to the structure as set forth above, the respective recessed portions have partition walls formed in the intermediate portions thereof in the axial direction. And, each recessed portion includes: a bottom wall (for example, a bottom wall 96 which will be discussed in the following embodiments); a pair of peripheral direction walls (for example, peripheral direction walls 97 which will be discussed in the following embodiments) disposed opposed to each other in the peripheral direction of the recessed portion; and, a pair of recessed portions which are respectively disposed on both sides in the axial direction and are defined by the axial side surfaces (for example, axial side surfaces 94a) of the partition wall.

According to an embodiment of the invention in addition to the structure as set forth above, the bottom wall of the recessed portion, when it is viewed from the lateral side thereof, crosses two virtual lines respectively connecting together the center of the shaft and the radially outer side edge portions (for example, radially outer side edge portions 97a which will be discussed in the following embodiments) of the pair of peripheral direction walls.

According to an embodiment of the invention in addition to the structure as set forth above, each of the recessed portions has a dovetail shape including a portion the arc distance of which between the pair of peripheral direction walls is greater on the radially inside thereof than on the radially outside thereof According to an embodiment of the invention in addition to the structure as set forth above, the flange includes a shaft side axial hole (for example, a shaft side axial hole 100 which will be discussed in the following embodiments) extending along the axial direction. And, the rotor frame includes an axial projection (for example, an axial projection 110 which will be discussed in the following embodiments) which enters into the shaft side axial hole.

According to an embodiment of the invention in addition to the structure as set forth above, the outer peripheral surface of the flange includes, in the intermediate portion thereof in the axial direction, a circular recessed groove (for example, a recessed groove 101 which will be discussed in the following embodiments) which is in communication with the shaft side axial hole. And, the rotor frame has a circular projection (for example, a circular projection 111 which will be discussed in the following embodiments) which is allowed to communicate with the axial projection and also which enters into the recessed groove.

According to an embodiment of the invention in addition to the structure as set forth above, the rotor further includes an outer ring (for example, an outer ring 50 which will be discussed in the following embodiments) extending in the radial direction and including a ring side mounting hole (for example, a ring side mounting hole 51 which will be discussed in the following embodiments) the hole diameter of which is larger on the outer peripheral side thereof than on the inner peripheral side thereof. And, the rotor frame includes an outer cylindrical portion (for example, an outer cylindrical portion 33 which will be discussed in the following embodiments) formed on the radially outer side of the plurality of ribs and an outward projection (for example, an outward projection 35 which will be discussed in the following embodiments) which is projected from the outer peripheral surface of the outer cylindrical portion and enters into the ring side mounting hole of the outer ring.

According to an embodiment of the invention there is provided a method for manufacturing a rotor for use in an axial gap type motor. Here, the motor includes: a rotor including a plurality of main magnets respectively magnetized in the axial direction and disposed at predetermined intervals in the peripheral direction of the rotor, a plurality of yokes respectively disposed at least on one side of the plurality of main magnets in the axial direction, and a rotor frame including at least a plurality of ribs respectively disposed between the main magnets adjoining each other in the peripheral direction and extending in the radial direction and an inner cylindrical portion disposed on the radially inner side of the plurality of ribs, while the rotor can be rotated around the rotational axis; a stator mounted at least from one side in the axial direction in such a manner that it is opposed to the rotor; and, a shaft which can be connected to the inner cylindrical portion of the rotor frame and is used to transmit power given from the rotor. Specifically, the method includes: a step in which a tape-shaped electromagnetic steel plate is wound to thereby form a laminated member capable of forming the plurality of yokes; and, a step in which, in a state where the laminated member and the shaft having a concavo-convex shape in the outer peripheral surface thereof are positioned respectively with respect to molds (for example, first and second molds 80 and 81 which will be discussed in the following embodiments), a die-cast alloy is poured into the molds to thereby form the rotor frame the connecting surface of the inner cylindrical portion of which, where the shaft is connected, has a concavo-convex shape.

According to an embodiment of the invention in addition to the invention, the rotor further includes an outer ring which extends in the radial direction of the rotor and has a ring side mounting hole the hole diameter of which is larger on the outer peripheral side thereof than on the inner peripheral side thereof. And, in the frame forming step, the rotor frame is cast in such a manner that, in a state where the outer ring is further positioned with respect to the molds, the die-cast alloy is poured into the ring side mounting holes of the outer ring.

EFFECTS OF THE INVENTION

According to an embodiment of the inventions since the rotor frame is produced by pouring the die-cast alloy into the molds, the yokes to be formed by the laminated member produced by winding can be firmly unified with the rotor frame, thereby being able to secure the rigidity that can withstand a centrifugal force due to the rotation of the rotor and a magnetic suction force given from the stator.

According to an embodiment of the inventions the winding start and end portions of the laminated member are fixed by the step portions that are formed respectively in the inner and outer cylindrical portions of the rotor frame due to the pouring of the die-cast alloy into the rotor frame, whereby the laminated member can be fixed to the rotor frame with high degree of roundness.

According to an embodiment of the inventions since the shaft is unified with the rotor frame when the die-cast alloy is poured into the molds to thereby cast the rotor frame, the operation to assemble the rotor frame to the shaft can be facilitated, whereby the uniform products, namely, uniform motors can be mass produced.

According to an embodiment of the inventions even when the die-cast alloy of the rotor frame is deformed due to the shrinkage thereof or the like, the rotor frame can prevented from varying in the dimension thereof.

According to an embodiment of the inventions since the outer ring is unified with the rotor frame when the die-cast alloy is poured into the outer ring to thereby cast the rotor frame, the operation to pressure insert the outer ring into the rotor frame can be eliminated.

According to an embodiment of the inventions since the die-cast alloy is prevented from being poured into the main magnet inserting hole in the axial direction where the magnetic flux is applied, and also since the peripheral direction side surfaces of the main magnets are covered with the die-cast alloy, the leakage of the magnetic flux and shorts can be prevented.

According to an embodiment of the inventions since there is employed a substantial Halbach array, due to the magnetic flux lens effect that restricts the direction of the magnetic flux of the main magnets, the amount of generation of effective magnetic flux can be increased relatively. Also, the sub magnets can be prevented from shifting in position in the axial direction thereof.

According to an embodiment of the inventions the yokes can be enveloped by the rotor frame after the rotor frame is cast by pouring a die-cast alloy thereinto in a state where the magnet portions are removed from the yokes. Thus, even when there is used a die-cast alloy having a high casting temperature, the degradation of the magnet coercive force due to an increase in the casting temperature can be prevented.

According to an embodiment of the invention the yokes and main magnets can be unified with each other by casting the rotor frame. This can facilitate the assembling operation and also can prevent the main magnets from shifting in position.

According to an embodiment of the invention since the laminated member is positioned in the radial direction by the step portions formed in the molds, the position shift of the laminated member can be prevented, the time necessary for working the rotor can be reduced, and the production cost of the rotor can be reduced.

According to an embodiment of the invention the positioning of the rotor frame in the peripheral direction of the ribs is possible and thus the rotor frame casting operation can be carried out with enhanced precision.

According to an embodiment of the inventions since the rotor frame is produced by pouring the die-cast alloy thereinto, and also since the connecting surface between the inner cylindrical portion of the rotor frame and shaft has a concavo-convex shape, when the yokes respectively formed by the winding-produced laminated member are fixed to the shaft through the rotor frame, the rotor frame and shaft can be firmly fixed to each other.

According to an embodiment of the invention the thickness of the inner cylindrical portion can be reduced and the occurrence of casting cavities (sink cavities, winding cavities) can be reduced.

According to an embodiment of the invention since the plurality of projections of the rotor frame are respectively fitted into the plurality of recessed portions of the flange through the pouring of the die-cast alloy, the flange and rotor frame can be prevented from shaking or shifting in position relative to each other in the peripheral direction of the rotor.

According to an embodiment of the invention the substantial gear-like shape makes it possible to set a uniform connecting surface which has no influence on the rotation of the rotor. Also, the partition walls can prevent the flange and rotor frame from shaking or shifting in position relative to each other in the axial direction.

According to an embodiment of the invention the partition walls and paired recessed portions formed on both sides in the axial direction can prevent the flange and rotor frame from shaking or shifting in position relative to each other in the axial direction.

According to an embodiment of the inventions by increasing the size of the bottom wall, the deformation of the projections of the rotor frame in the radial direction formed through the pouring of the die-cast alloy can be prevented, while the shaking motion of the rotor frame due to a centrifugal force can be prevented.

According to an embodiment of the invention since the axial projections of the rotor frame respectively enter into the shaft side axial holes of the flange through the pouring of the die-cast alloy, the rotor frame and flange can be prevented from shaking or shifting in position relative to each other in the circumferential direction and in the radial direction.

According to an embodiment of the invention since the circular projections of the rotor frame enters into the circular recessed grooves of the flange through the pouring of the die-cast alloy, the flange and rotor frame can be prevented from shaking or shifting in position relative to each other in the axial direction.

According to an embodiment of the inventions the outer ring can be unified with the rotor frame by pouring the die-cast alloy into the outer ring without pressure inserting the outer ring into the rotor frame. And, since the positional shift of the outer ring relative to the rotor frame in the radial direction due to variations in the temperature can be prevented, removal of the yokes and main magnet due to a centrifugal force produced when the rotor is rotated at a high speed can be prevented.

BRIEF DESCRIPTION OF DRAWINGS

FIG. 1 is a perspective view of a whole of an axial gap type motor according to the present invention.

FIG. 2 is an exploded perspective view of an axial gap type motor according to a first embodiment of the present invention.

FIG. 3 is an exploded perspective view of a rotor shown in FIG. 2.

FIG. 4 is an exploded perspective view of the yokes, main magnets and sub magnets of the rotor shown in FIG. 2.

FIG. 5 is a plan view of a tape-shaped electromagnetic steel plate.

FIG. 6 is a view to show how the electromagnetic steel plate is wound to thereby produce a laminated member.

FIG. 7 is an enlarged perspective view of the main portions of the rotor, showing a state where the main and sub magnets of the rotor are inserted into the laminated member, and further showing a magnetic orientation of the main magnets and sub magnets.

FIG. 8 is an enlarged perspective view of the main portions of a rotor frame included in the rotor.

FIG. 9 is a longitudinal section view of the rotor, taken along the IX-IX line shown in FIG. 2.

FIG. 10 is a section view of the rotor, showing how the rotor is cast.

FIG. 11 is an exploded perspective view of a rotor used in an axial gap type motor according to a second embodiment of the present invention.

FIG. 12 is a section view of the rotor, showing how the rotor is cast.

FIG. 13 is an exploded perspective view of a rotor used in an axial gap type motor according to a third embodiment of the present invention.

FIG. 14 is a section view of the rotor shown in FIG. 13, showing how the rotor is cast.

FIG. 15 is an enlarged perspective view of the main portions of a rotor employed in an axial gap type motor according to a fourth embodiment of the present invention, showing a state where the rotor frame of the rotor is cast into a laminated member into which the main and sub magnets of the rotor have been inserted.

FIG. 16 is a section of the rotor shown in FIG. 15, showing how the rotor frame is cast.

FIG. 17 is a perspective view of an axial gap type motor according to a fifth embodiment of the present invention, with a rotor thereof cut in part.

FIG. 18 is a section view of the rotor taken along the XVIII-XVIII line shown in FIG. 17, with the rotor exploded in part.

FIG. 19 is a section view of the rotor shown in FIG. 17, showing how the rotor frame is cast.

FIG. 20 is an exploded perspective view of a rotor used in an axial gap type motor according to a sixth embodiment of the present invention.

[FIG. 21]

FIG. 22 is a partial section view of an outer ring used in the present motor, taken along the XXII-XXII line shown in FIG. 20.

FIG. 23 is a longitudinal section view of the rotor shown in FIG. 20, corresponding to the IX-IX line shown in FIG. 2.

FIG. 24 is a section view to show how the rotor frame is cast.

FIG. 25 is a partial side view of a rotor and a shaft according to a modification of the sixth embodiment.

FIG. 26 is a partial side view of a rotor and a shaft according to another modification of the sixth embodiment.

[FIG. 27]

FIG. 28 is a perspective view of a shaft shown in FIG. 27.

[FIG. 29]

FIG. 30 is a perspective view of a shaft shown in FIG. 29.

FIG. 31 is an exploded perspective view of a conventional rotor.

DESCRIPTION OF EMBODIMENT

Figure 1:
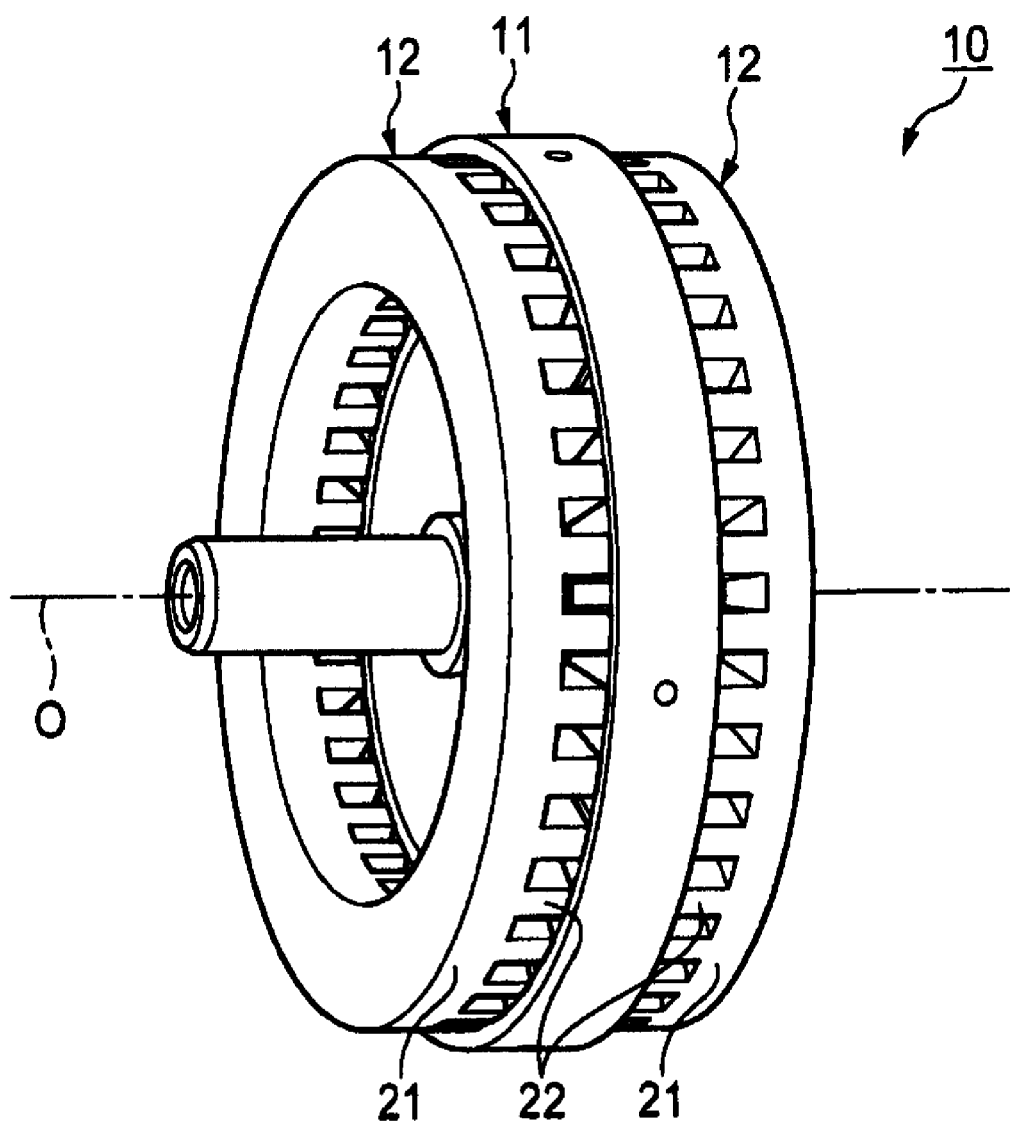
[FIG. 1]
Figure 2:
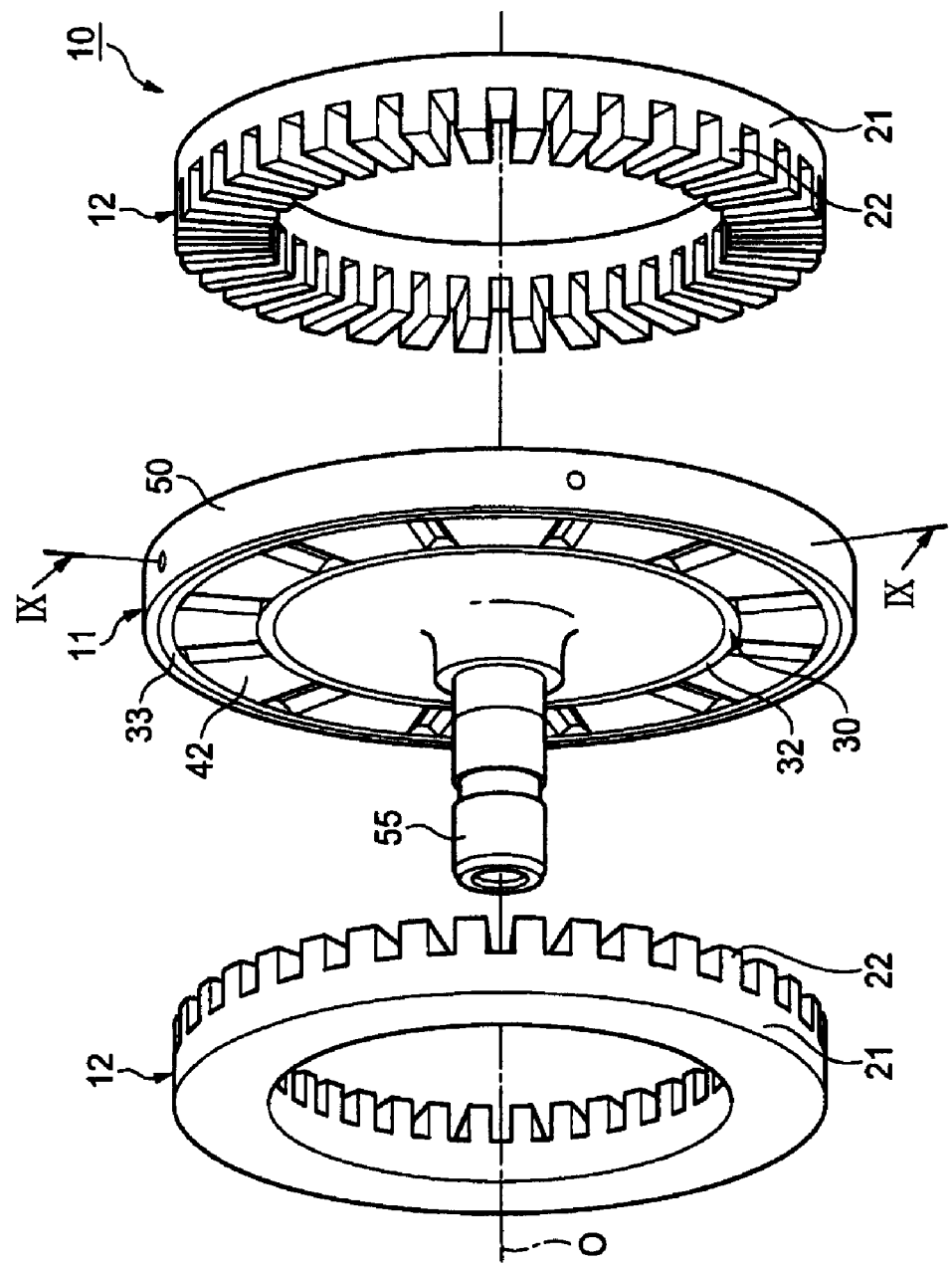
[FIG. 2]

Now, description will be given below specifically of the respective embodiments of an axial gap type motor according to the invention with reference to the accompanying drawings. Here, the drawings are to be viewed in the direction of reference numerals and signs.

<First Embodiment>

An axial gap type motor 10 according to a first embodiment of the invention, for example, as shown in FIG. 1, includes: a substantially circular-shaped rotor 11 which is provided rotatably around the rotational axis O of the axial gap type motor 10; a pair of stators 12 which are disposed opposed to each other in such a manner that they hold the rotor 11 between them from both sides in the rotational axis O direction, and also which include their respective a plurality of-phase stator windings used to generate a rotating magnetic field for rotating the rotor 11; and, a shaft 55 which is connected to the rotor 11 and is also used to transmit power from the rotor 11.

The axial gap type motor 10 is carried, as a drive source, onboard a vehicle such as a hybrid vehicle or an electric vehicle. When the output shaft of the motor 10 is connected to the input shaft of a transmission (not shown), the drive force of the axial gap type motor 10 can be transmitted through the transmission to the drive wheels (not shown) of the vehicle.

Also, when, in the decelerating time of the vehicle, there is transmitted a drive force to the axial gap type motor 10 from the drive wheels, the axial gap type motor 10 functions as a generator to generate a so called regenerative force and also to collect the kinetic energy of the vehicle body as electric energy (regenerative energy). Further, for example, in a hybrid vehicle, in the case that the rotation shaft of the axial gap type motor 10 is connected to the crankshaft of an internal engine (not shown), also when the output of the internal engine is transmitted to the axial gap type motor 10, the axial gap type motor 10 functions as a generator to generate generating energy.

Each stator 12 includes substantially circular plate shaped yokes 21, a plurality of teeth 22, - - - , 22 which respectively project toward the rotor 11 along the rotational axis O direction from their associated positions respectively existing on the mutually opposed surfaces of the mutually opposed stator yokes 21 and spaced from each other in the peripheral direction of the yokes 21 and also which respectively extend in the radial direction of the stator yokes 21, and a plurality of stator windings (not shown) respectively mounted between their associated teeth 22, 22.

Each stator 12 is, for example, a 6N type stator the main pole of which includes 6 poles (for example, U+, V+, W+, U−, V−, W−). Specifically, the U−, V−, W− poles of the other stator 12 are set such that they are opposed to the U+, V+, W+ poles of one stator 12 respectively in the rotational axis O direction. For example, for a pair of stators 12, 12 opposed to each other in the rotational axis O direction, the three teeth 22, 22, 22 of one stator 12 corresponding to one of U+, V+, W+ poles and U−, V−, W− poles are set opposed to the three teeth 22, 22, 22 of the other stator 12 corresponding to the other of U+, V+, W+ poles and U−, V−, W− poles in the rotational axis O direction. And, electric conduction for the teeth 22 of one stator 12 and the teeth 22 of the other stator 12 can be reversed in terms of an electric angle.

Figure 3:
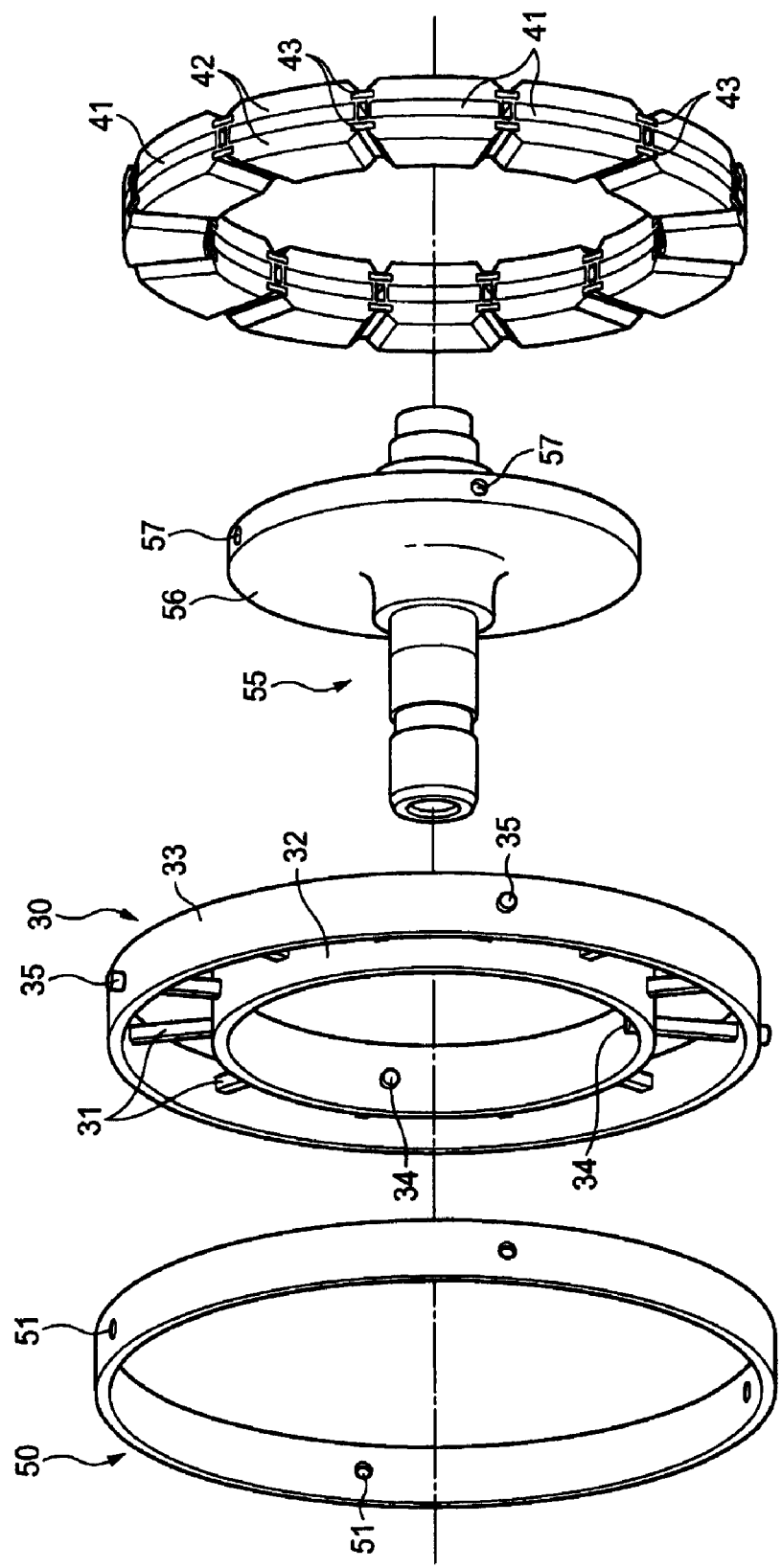
[FIG. 3]
Figure 4:
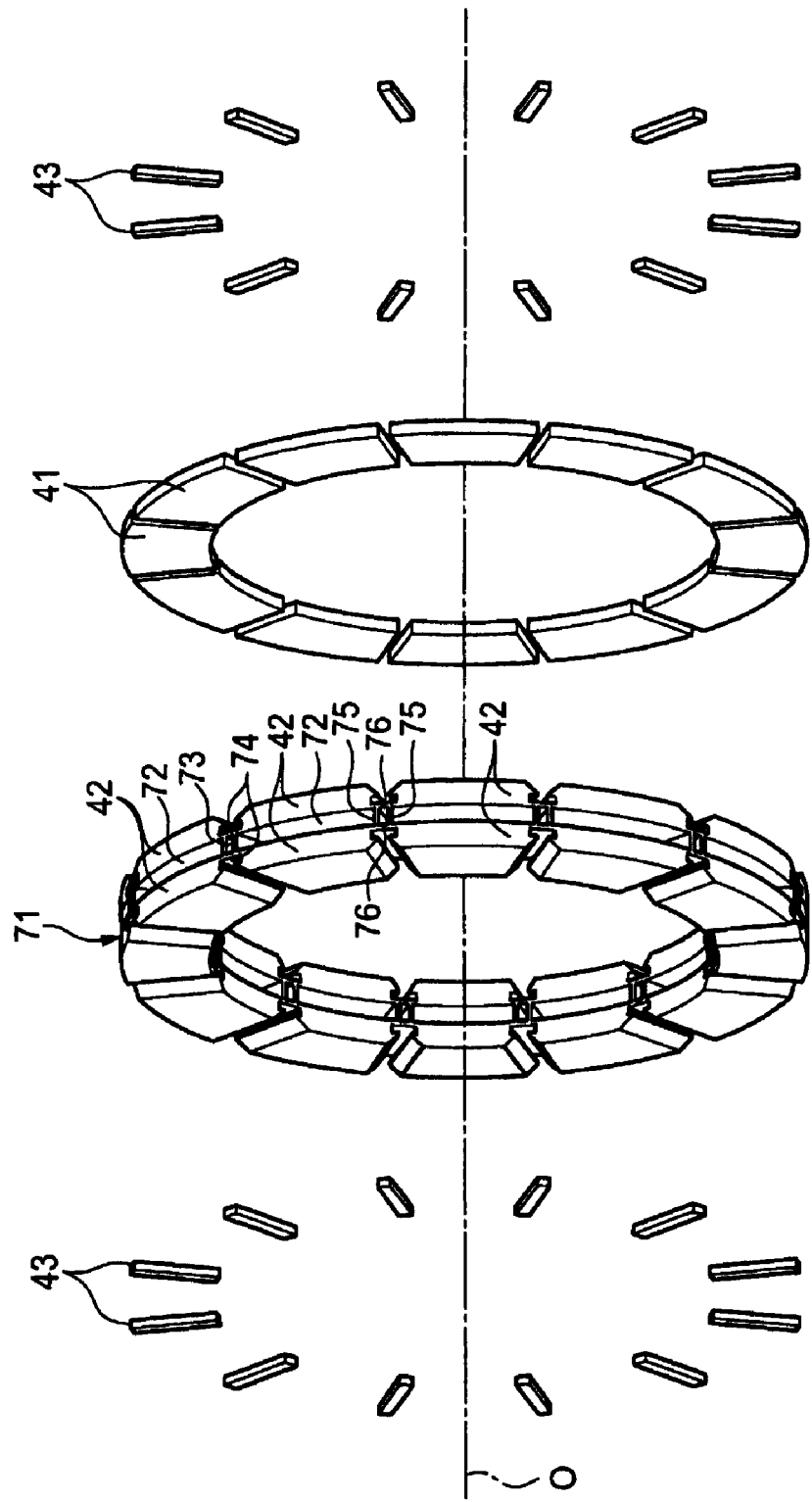
[FIG. 4]

The rotor 11, as shown in FIGS. 3 and 4, includes a plurality of main magnets 41, - - - , 41, a plurality of sub magnets 43, - - - , 43, a plurality of yokes 42, - - - , 42, a rotor frame 30 made of a non-magnetic member, and an outer ring 50.

Figure 5:
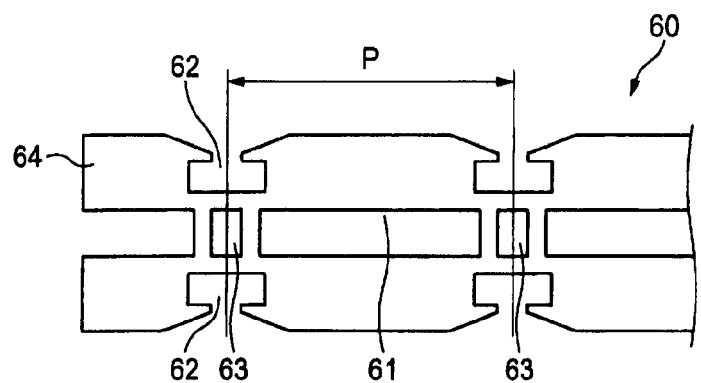
[FIG. 5]
Figure 6:
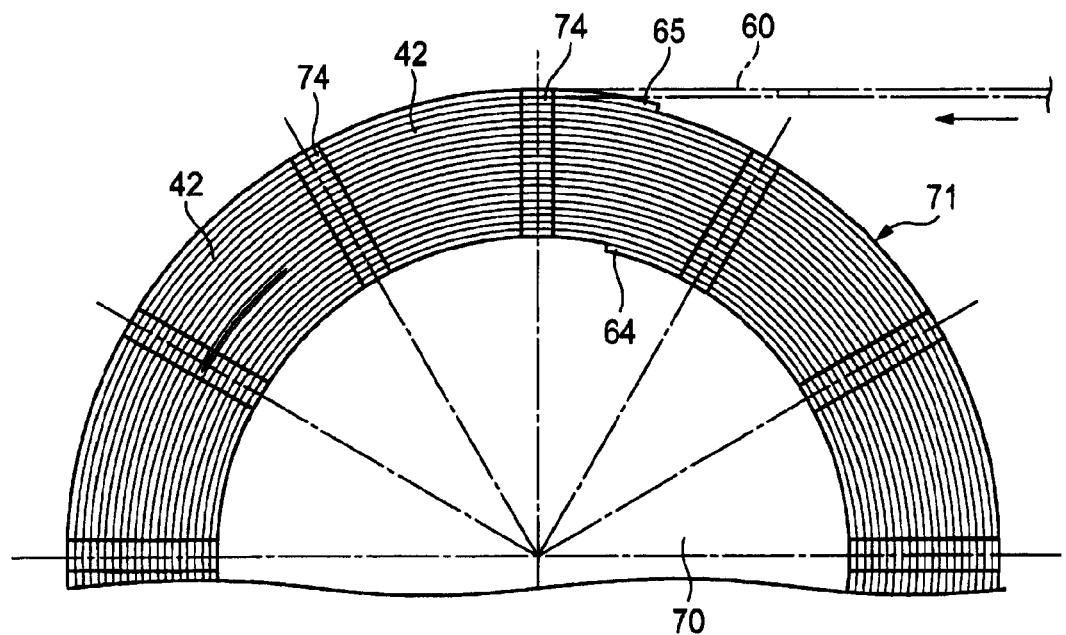
[FIG. 6]

The plurality of yokes 42, - - - , 42, as shown in FIGS. 5 and 6, are formed by a laminated member 71 which is produced by winding a tape-shaped electromagnetic steel plate 60. The tape-shaped electromagnetic steel plate 60 includes a main magnet receiving hole 61, sub magnet receiving holes 62 and rib receiving holes 63 which are respectively formed, for example, by punching out their corresponding portions of the electromagnetic steel plate 60 using a press forming machine. In the tape-shaped electromagnetic steel plate 60, as shown in FIG. 6, in a state where the winding start portion 64 thereof is provisionally secured onto a winding core 70, the winding core 70 is rotated to thereby wind the tape-shaped electromagnetic steel plate 60 and the winding end portion 65 thereof is cut and welded, thereby producing the laminated member 71.

Also, since the tape-shaped electromagnetic steel plate 60 is wound on the winding core 70, the longitudinal length thereof increases as the number of windings increases, that is, the first winding layer, second winding layer, third winding layer, - - - from the most radially inner side thereof. Therefore, in FIG. 5, where the distance between the centers of the rib receiving holes 63 is expressed as a pitch P, the pitches P of the respective winding layers are set such that they gradually increase toward outwardly in the radial direction of the laminated member 71.

In the thus wound-produced laminated member 71, in the middle portion thereof in the axial direction, there are alternately formed at predetermined intervals in the peripheral direction thereof: a plurality of main magnet inserting holes 72, - - - , 72 which are respectively formed by the main magnet receiving hole 61 and also which respectively have a substantially fan-like shape; and, a plurality of rib storing holes 73, - - - , 73 which are formed by the rib receiving holes 63 and also which respectively have a substantially rectangular parallelepiped shape. Also, on both sides of the laminated member 71 in the axial direction, there are alternately formed at predetermined intervals in the peripheral direction thereof: the plurality of yokes 42, - - - , 42 respectively having a substantially fan-like shape; and, a plurality of sub magnet storing portions 74, - - - , 74 which are respectively formed by the sub magnet receiving holes 62 and also which respectively have a substantially rectangular parallelepiped shape opened outwardly in the axial direction of the laminated member 71.

Also, the plurality of yokes 42, - - - , 42 are respectively disposed on both sides of the plurality of main magnet inserting holes 72, - - - , 72 in the axial direction; and, the plurality of sub magnet storing portions 74, - - - , 74 are respectively disposed on both sides of the plurality of rib storing holes 73, - - - , 73 in the axial direction. The main magnet inserting holes 72 and rib storing holes 73 are separated from each other by an axial connecting portion 75 which is used to connect together the yokes 42 existing on both sides in the axial direction of the laminated member 71. And, the sub magnet storing portions 74 and rib storing holes 73 are separated from each other by a peripheral connecting portion 76 which is used to connect together the yokes 42 existing on both sides in the peripheral direction of the laminated member 71.

Into the respective main magnet inserting holes 72, - - - , 72 of the thus structured laminated member 71, there are inserted a plurality of main magnets 41, - - - , 41 respectively having a substantially fan-like shape and also having substantially the same dimension as the inserting holes 72, - - - , 72; and, into the respective sub magnet storing portions 74, - - - , 74, there are inserted a plurality of sub magnets 43, - - - , 43 respectively having a substantially rectangular parallelepiped shape and also having substantially the same dimension as the storing portions 74, - - - , 74.

Here, preferably, the length of each main magnet inserting hole 72 in the axial direction may be set substantially equal to that of the main magnet 41 in order that a die-cast alloy (which will be discussed later) can be prevented from being caught in the inserting hole 72; and also, the length of the inserting hole 72 in the peripheral direction may be set slightly larger than that of the main magnet 41 in order that the peripheral direction side surface of the main magnet 41 can be covered with the die-cast alloy.

Figure 7:
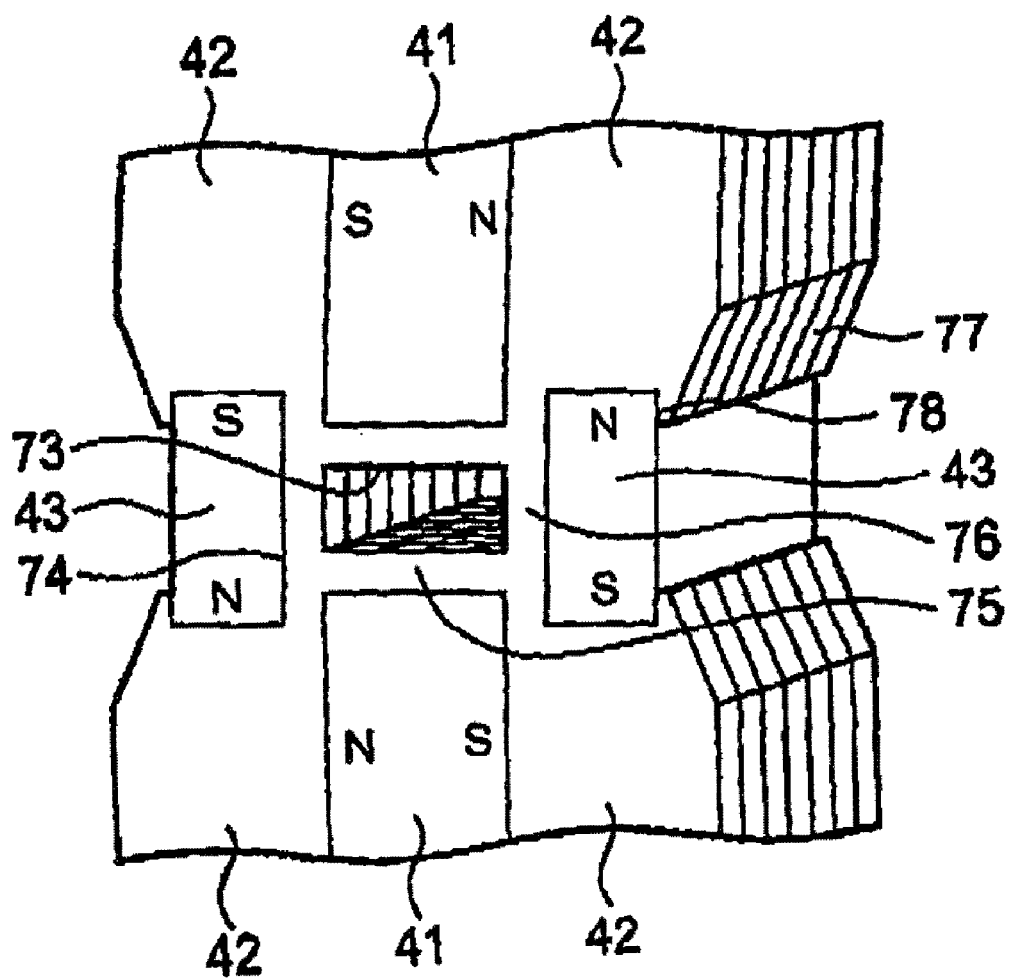
[FIG. 7]

Also, the sub magnet storing portion 74, as shown in FIG. 7, positions the sub magnet 43 in the axial direction using a peripheral direction connecting portion 76 interposed between two mutually adjoining yokes 42 and a projection 78 provided on the leading end portion of an inclined surface 77 formed in the peripheral direction end portion of the yoke 42; and also, the sub magnet storing portion 74 positions the sub magnet 43 in the peripheral direction between the peripheral direction side surfaces of the two mutually adjoining yokes 42.

According to the above structure, the plurality of main magnets 41, - - -, 41 are disposed at predetermined intervals in the peripheral direction and the magnetizing directions thereof are directed in the axial direction in such a manner that they are different from each other in every main magnets 41, 41 which adjoin each other in the peripheral direction. Also, the plurality of sub magnets 43, - - -, 43 are respectively interposed between two yokes 42 mutually adjoining in the peripheral direction and the magnetizing directions thereof are directed in a direction perpendicular to the axial direction and radial direction. The sub magnets 43, 43, which adjoin each other in the peripheral direction, are different from each other in the magnetizing direction; and, the sub magnets 43, 43, which adjoin each other in the axial direction, are also different from each other in the magnetizing direction.

Further, the sub magnets 43, 43, which cooperate together in holding the yoke 42 situated on one side in the axial direction from both sides in the peripheral direction with respect to their associated main magnets 41, are disposed in such a manner that their respective magnetic poles having the same polarity as one magnetic pole of the main magnet 41 are opposed to each other. And, the sub magnets 43, 43, which cooperate together in holding the yoke 42 situated on the other side in the axial direction from both sides in the peripheral direction, are disposed in such a manner that their respective magnetic poles having the same polarity as the other magnetic pole of the main magnet 41 are opposed to each other. Thus, owing to a magnetic flux lens effect which can be provided by a so called substantial permanent magnet Halbach array, the respective magnetic fluxes of the main magnet 41 and sub magnets 43, 43 converge and the effective magnetic flux interlinking with the respective stators 12, 12 increases relatively.

Also, since the yokes 42, - - -, 42 respectively include inclined surfaces 77 formed in the peripheral direction end portions thereof, a polar arc angle is adjusted to prevent a sudden variation in the magnetic resistance between the stators 12 and 12, thereby being able to restrict the generation of a torque ripple.

The rotor frame 30 includes: a plurality of ribs 31, - - -, 31 which respectively extend in the radial direction within the rib storing holes 73, - - -, 73 of the laminated member 61 and also which are interposed between the main magnets 41 mutually adjoining in the peripheral direction; and, an inner cylindrical portion 32 and an outer cylindrical portion 33 which are respectively disposed on the radially inner side and on the radially outer side of the plurality of ribs 31, - - -, 31 and which are connected together by these ribs 31, - - -, 31.

A shaft 55, which is to be connected to an externally provided drive shaft (for example, the input shaft of the transmission of a vehicle), is integrally connected and fixed to the inner peripheral portion of the inner cylindrical portion 32 by a flange 56 the diameter of which increases toward the inner cylindrical portion 32 of the rotor frame 30. As shown in FIG. 3, the flange 56 includes a plurality of shaft side mounting holes 57 for the rotor frame respectively formed in the outer peripheral surface of the flange 56. A plurality of inward projections 34 which are respectively formed on the inner peripheral surface of the inner cylindrical portion 32 of the rotor frame 30 enter into these shaft side mounting holes 57 by pouring the die-cast alloy into the rotor frame 30.

Also, to the outer peripheral portion of the outer cylindrical portion 33, there is integrally connected and fixed a circular outer ring 50 made of a non-magnetic member such as a stainless steel plate, thereby being able to prevent the yokes 43 from spreading outwardly in the radial direction due to a centrifugal force which is generated when the rotor rotates at a high speed. The outer ring 50 includes a plurality of ring side mounting portions 51 for the rotor frame which respectively penetrate through the outer ring 50 in the radial direction of the outer ring 50. A plurality of outward projections 35 which are respectively formed on the outer peripheral surface of the outer cylindrical portion 33 of the rotor frame 30 enter into these ring side mounting portions 51 by pouring the die-cast alloy into the rotor frame 30.

Figure 8:
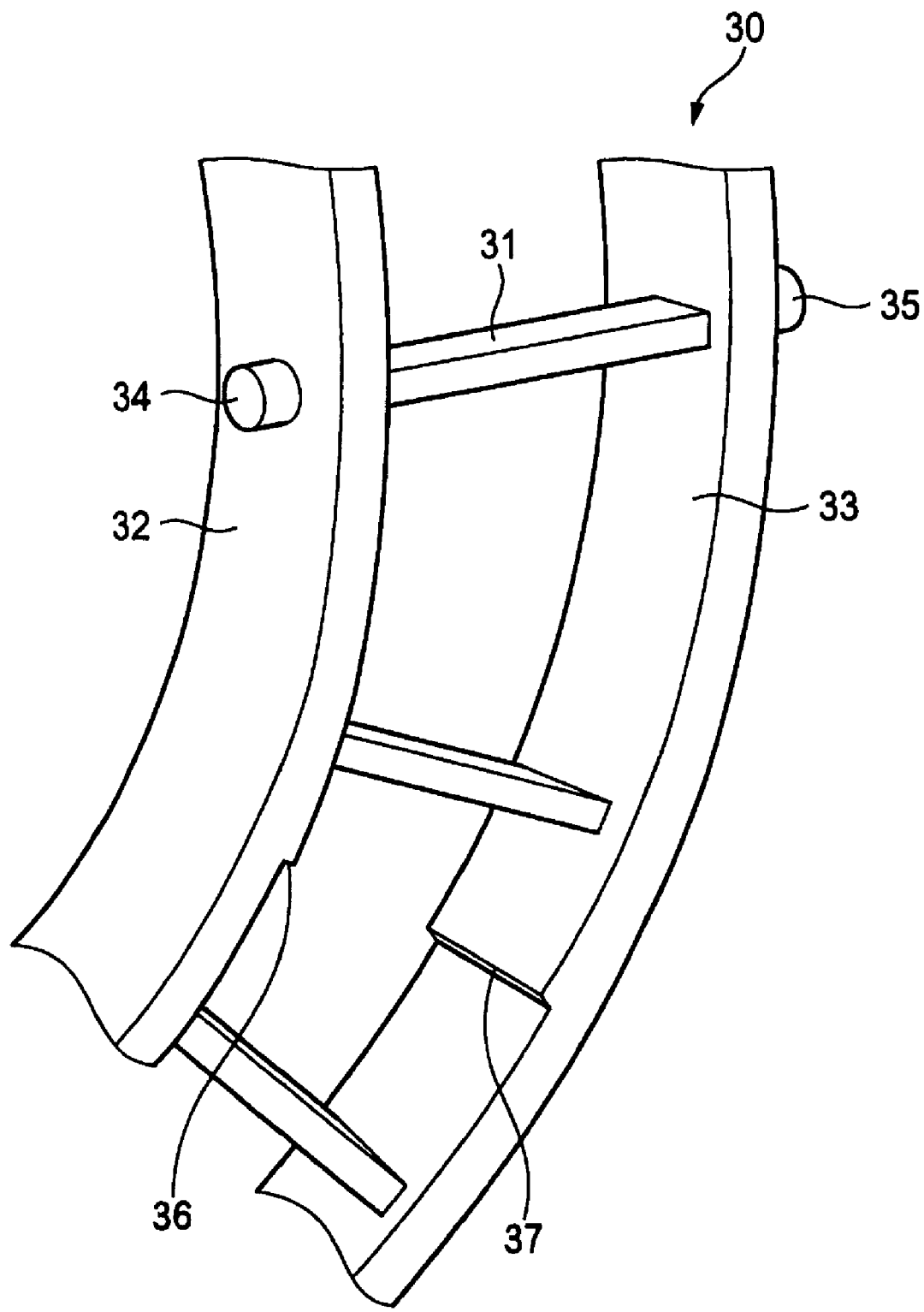
[FIG. 8]
Figure 9:
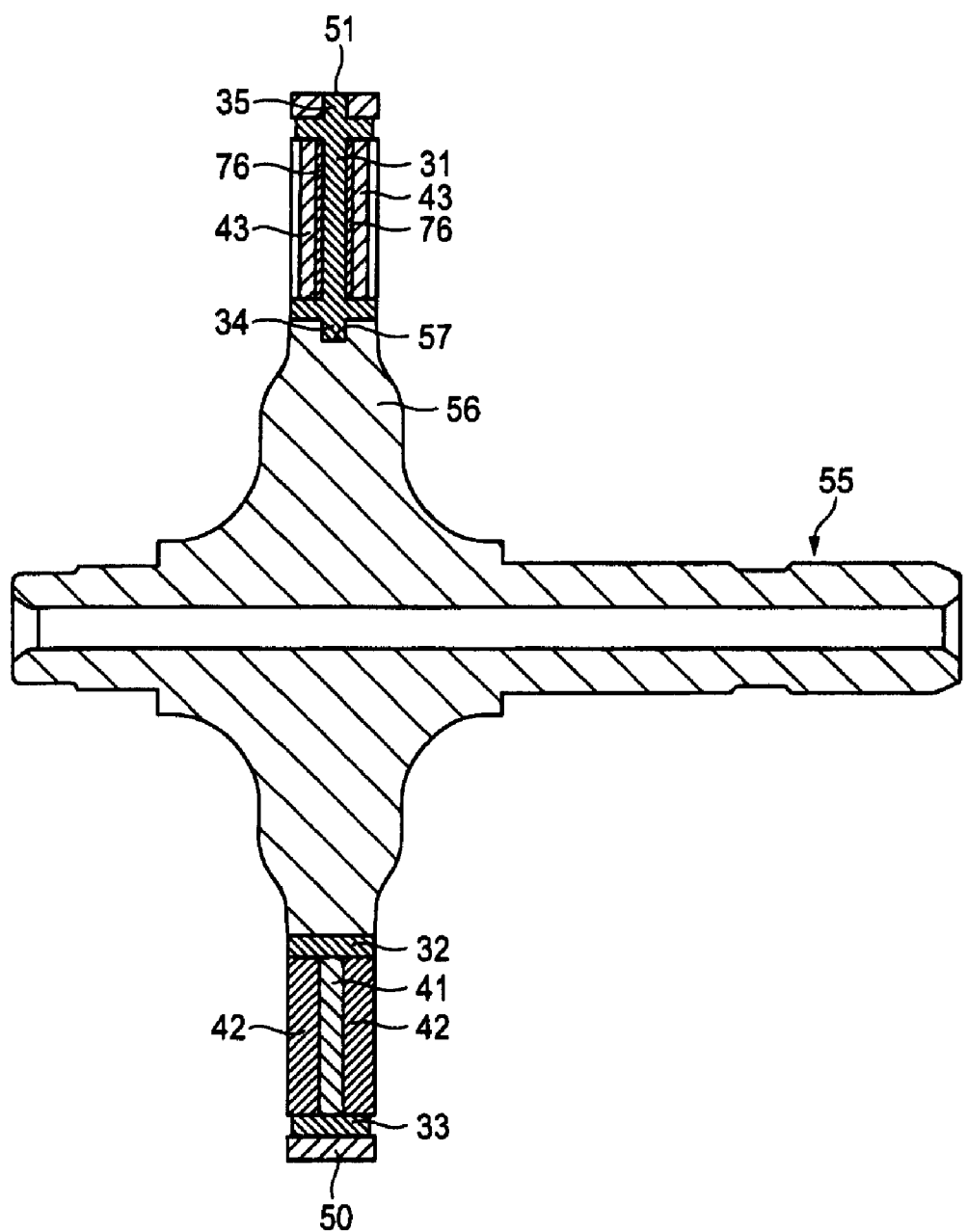
[FIG. 9]

Also, as shown in FIG. 8, the inward projections 34 and outward projections 35 are respectively formed along the extending direction of the ribs 31 in order to be able to facilitate the flow of the molten die-cast alloy when it is poured.

Figure 10:
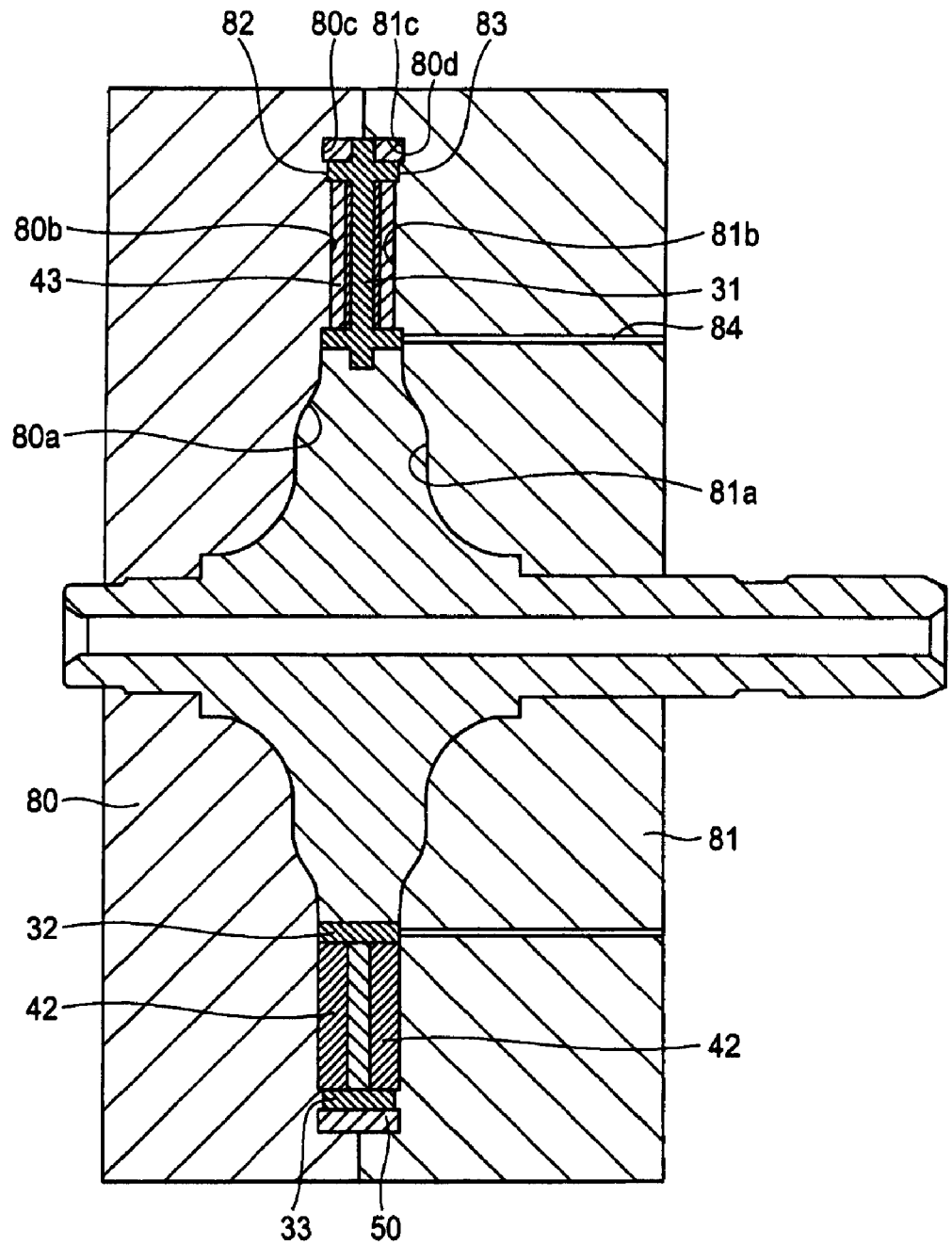
[FIG. 10]

To form the rotor frame 30 having the above structure, as shown in FIG. 10, the laminated member 71 with the main magnets 41, - - -, 41 and sub magnets 43, - - -, 43 inserted therein, shaft 55 and outer ring 50 may be stored into first and second molds 80 and 81 and a non-magnetic die-cast alloy such as an aluminum alloy may be then poured into the molds 80 and 81.

The first and second molds 80 and 81 are respectively divided into two in the axial direction and are also divided by the one-side side surfaces of the outer ring 50 and yoke 42 in the axial direction. The molds 80 and 81 respectively include side surfaces 80a, 81a, 80b, 81b, 80c and 81c respectively corresponding to the axial side surfaces of the shaft 55, the axial side surfaces of the yoke 42 and sub magnet 43, and the axial side surfaces of the outer ring 50. Also, the first mold 80 includes an inner peripheral surface 80d which corresponds to the outer peripheral surface of the outer ring 50.

In the radially outer side portions of the side surfaces 80b and 81b of the molds 80 and 81 which respectively correspond to the axial side surfaces of the yoke 42 and sub magnet 43, there are provided step portions 82 and 83 that are used to position the laminated member 71, into which the main magnets 41, - - -, 41 and sub magnets 43, - - -, 43 have been inserted, in the radial direction thereof. Also, the laminated member 71 is positioned in the peripheral direction using the winding start portion 64 and winding end portion 65 in order to facilitate the flow of the molten die-cast alloy into the shaft side mounting holes 57 of the shaft 55 and into the ring side mounting holes 51 of the outer ring 50 when it is poured into the molds.

And, in a state where the main magnets 41, - - -, 41, sub magnets 43, - - -, 43, laminated member 71, shaft 55 and outer ring 50 are stored in the first and second molds 80 and 81, the molds 80 and 81 are closed, and a die-cast alloy is poured from a circular gate 84 formed in the second mold 81 into a space formed between the two molds 80 and 81. The gate 84 is disposed such that it opens at a radial direction position corresponding to the inner cylindrical portion 32 of the rotor frame 30. Owing to this, after the die-cast alloy poured from the gate 84 flows into a space constituting the inner cylindrical portion 32, it passes through the rib storing hole 73 formed in the laminated member 71 and flows into a space constituting the outer cylindrical portion 33. Further, the die-cast alloy flows also into the shaft side mounting hole 57 of the shaft 55 and the ring side mounting hole 51 of the outer ring 50. Thus, through the pouring of the die-cast alloy, there is formed the rotor frame 30 which includes the rib 31s, inner cylindrical portion 32, outer cylindrical portion 33, inward projections 34, and outward projections 35.

Also, in the inner cylindrical portion 32 and outer cylindrical portion 33 that have been formed through the pouring of the die-cast alloy, there are formed step portions 36 and 37 (see FIG. 8) which respectively correspond to the shapes of the winding start portion 64 and winding end portion 65. Thus, the inner and outer peripheral surfaces of the laminated member 71 are respectively situated substantially on a concentric circle, thereby being able to prevent the centers of the yokes formed by the wound-produced laminated member 71 from differing from each other and thus to prevent the laminated member 71 form being imbalanced due to the different centers of the yokes.

Here, as a die-cast alloy to be poured into the molds 80 and 81 in a state where the main magnets 41, - - -, 41, sub magnets 43, - - -, 43 are inserted into the laminated member 71, it is necessary to choose a material the pouring temperature of which is such temperature as does not degrade the coercive forces of the respective magnet portions 41, - - -, 41, 43, - - -, 43. Specifically, as such die-cast alloy, there may be chosen the above-mentioned aluminum alloy.

Therefore, in the axial gap type motor 10 and the method for manufacturing the rotor of such motor according to the present embodiment, the rotor 11 includes: the plurality of main magnets 41, - - -, 41 which are respectively magnetized in the axial direction and disposed at predetermined intervals in the peripheral direction of the rotor 11; a plurality of yokes 42, - - -, 42 which are respectively disposed on both sides of the plurality of main magnets 41, - - -, 41 in the axial direction; and, a rotor frame 30 including the plurality of ribs 31, - - -, 31 respectively interposed between the main magnets 41, - - -, 41 adjoining each other in the peripheral direction and extending in the radial direction, and the inner cylindrical portion 32 and outer cylindrical portion 33 respectively disposed on the radially inner side of the plurality of ribs 31, - - -, 31 and on the radially outer side thereof. And, the plurality of yokes 42, - - -, 42 are formed by the laminated member 71 which is produced by winding the tape-shaped electromagnetic steel plate 60, while the rotor frame 30 is formed by pouring a die-cast alloy into the first and second molds 80 and 81 in a state where the laminated member 71 is positioned with respect to the first and second molds 80 and 81. Thus, the yokes 42, - - -, 42 formed by the wound-produced laminated member 71 can be firmly unified with the rotor frame 30, thereby being able to secure such rigidity as can withstand a centrifugal force given due to the rotation of the rotor 11 and a magnetic suction force given from the stator 12.

Also, the inner cylindrical portion 32 and outer cylindrical portion 33 of the rotor frame 30 respectively include step portions 36 and 37 to which the winding start portion 64 and winding end portion 65 of the laminated member 71 can be fixed, while the inner and outer peripheral surfaces of the laminated member 71 respectively structuring the plurality of yokes 42 are respectively situated substantially on a concentric circle. Therefore, the step shapes of the winding start portion 64 and winding end portion 65 can be absorbed by the pouring of the die-cast alloy and thus it is not necessary to fix them using a complicated fastening method such as a shrink-fitting method or a force-fitting method, whereby the laminated member 71 can be fixed to the rotor frame 30 with proper roundness. Also, since the winding start portion 64 and winding end portion 65 are fixed by the step portions 36 and 37, the laminated member 71 is prevented from unwinding, which eliminates the need of an extra operation such as a calking operation.

Further, the motor 10 further includes the shaft 55 which can transmit power given from the rotor 11 and in the outer peripheral surface of which there can be formed a shaft side mounting hole 57; and, the rotor frame 30 has the inward projection 34 which, when the die-cast alloy is poured into the molds, enters into the shaft side mounting hole 57 of the shaft 55. Thus, since the shaft 55 is unified with the rotor frame 30 when the rotor frame 30 is cast, an operation to assemble the rotor frame 30 to the shaft 55 can be facilitated, whereby uniform products, that is, uniform rotors can be mass produced.

Also, since the shaft 55 includes the flange 56 the diameter of which increases toward the inner peripheral portion of the rotor frame 30, even when the die-cast alloy of the rotor frame 30 is deformed due to shrinkage or the like, the shaft 55 can be prevented from being changed in dimension.

Further, the rotor 11 further includes the outer ring 50 in the inner peripheral surface of which there can be formed the ring side mounting hole 51, while the rotor frame 30 has the outward projection 35 which enters into the ring side mounting hole 51 of the outer ring 50. Thus, since the outer ring 50 is unified with the rotor frame 30 when the rotor frame 30 is cast, there is eliminated the operation to pressure insert the outer ring 50 into the rotor frame 30. Also, according to the present embodiment, since the shaft 55 and outer ring 50 are both unified with the rotor frame 30 when the rotor frame 30 is cast, the rotor manufacturing process can be simplified further.

Since the rotor frame 30 is cast in a state where the plurality of main magnets 41, - - -, 41 are inserted into the laminated member 71, the yokes 42, - - -, 42 and main magnets 41, - - -, 41 can be unified with each other by casting the rotor frame 30, which can facilitate the assembling operation and also the main magnets 41, - - -, 41 can be prevented from shifting in position.

Also, since, as the die-cast alloy for forming the rotor frame 30, there is chosen the material which has such a pouring temperature as does not degrade the coercive forces of the main magnets 41, - - -, 41, the degradation of the main magnets 41, - - -, 41 due to the pouring of the die-cast alloy can be prevented.

In addition, in the laminated member 71, there are formed main magnet insertion holes 72 into which the main magnets 41 can be inserted. The length of each main magnet insertion hole 72 in the axial direction is set substantially equal to that of the main magnet 41, while the length of the main magnet insertion hole 72 in the peripheral direction is set larger than that of the main magnet 41. Therefore, the die-cast alloy can be prevented from getting caught in the axial direction where the magnetic flux is applied, and the peripheral direction side surface of the main magnet is covered with the die-cast alloy, thereby being able to prevent the occurrence of magnetic flux leakage and short circuits.

Also, the rotor 11 further includes a plurality of sub magnets 43 which, between the yokes 42 adjoining each other in the peripheral direction, are respectively disposed in the plurality of sub magnet storing portions 74 of the laminated member respectively formed inwardly of the axial side surfaces of the yokes 42 and also which can be magnetized in a direction perpendicular to the axial direction and radial direction. Thus, there is provided a substantially Halbach array and, therefore, owing to a magnetic flux lens effect which can restrict the direction of the magnetic flux of the main magnet, the amount of effective magnetic flux can be increased relatively.

Since, in the first and second molds 80 and 81 respectively used when casting the rotor frame 30, there are formed the step portions 82 and 83 which are used to position the yokes 42 in the radial direction, the laminated member 71 can be prevented from shifting in position, the time necessary for working the rotor can be reduced, and the production cost of the rotor can be reduced.

Since the rotor frame 30 is cast in a state where the laminated member 71 is positioned in the peripheral direction by the winding start portion 64 and winding end portion 65 of the laminated member 71, the positioning of the ribs 31 in the peripheral direction is possible, whereby the casting operation can be carried out with high precision.

Especially, according to the present embodiment, the casting or pouring material can be poured properly with respect to the inward projection 34 and outward projection 35 which are respectively formed along the extending direction of the ribs 31.

<Second Embodiment>

Now, description will be given below of a second embodiment according to the invention with reference to FIGS. 11 and 12. Here, in the drawings, the same composing parts as the first embodiment are given the same designations and thus the duplicate description thereof is omitted here.

Figure 11:
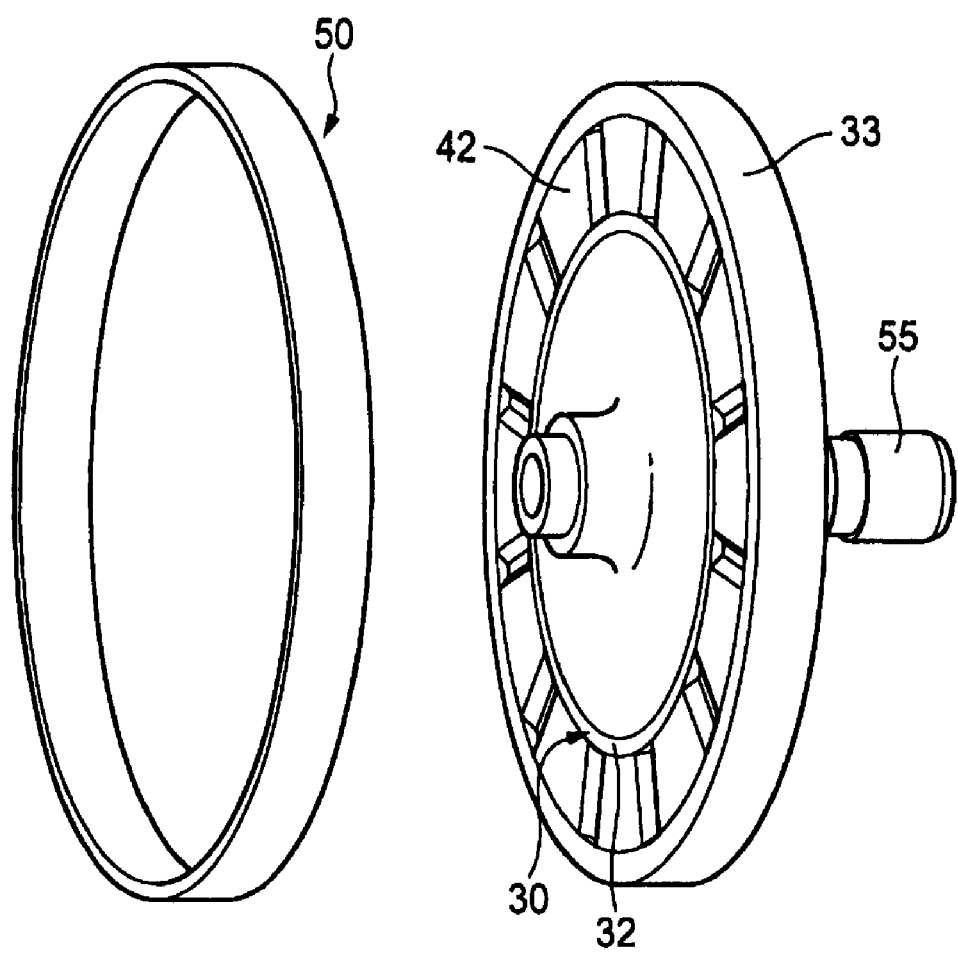
[FIG. 11]
Figure 12:
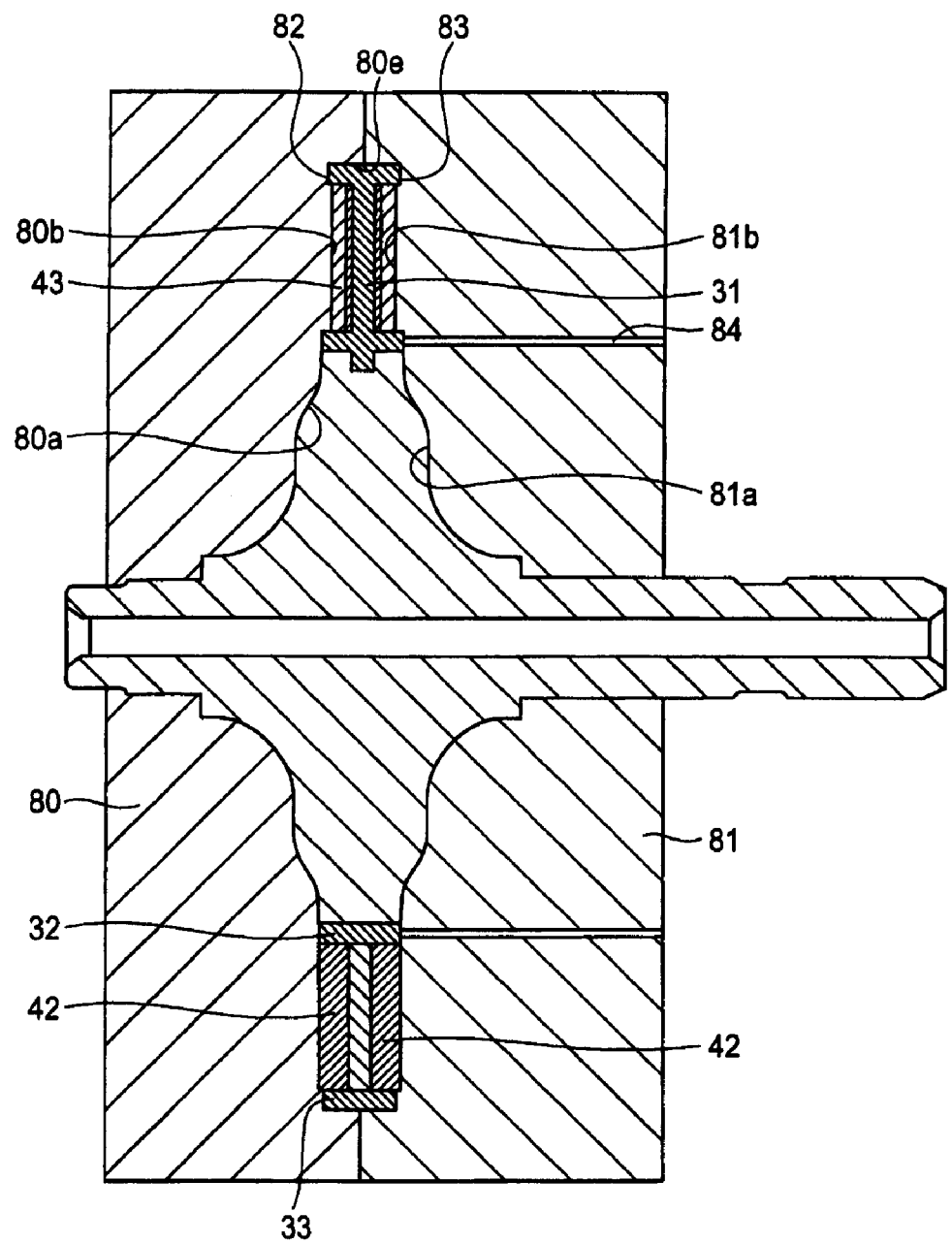
[FIG. 12]

In a rotor 11 according to the present embodiment, as shown in FIGS. 11 and 12, a rotor frame 30 is formed by pouring a die-cast alloy into molds 80 and 81 in a state where the laminated member 71 with the main magnets 41, - - -, 41 and sub magnets 43, - - -, 43 inserted therein and the shaft 55 are respectively stored in the molds 80 and 81. And, the outer ring 50 is fixed to the outer peripheral surface of the outer cylindrical portion 33 of the rotor frame 30 after it is cast, by a force-fitting or a shrink-fitting. Therefore, since the outer ring 50 energizes the outer cylindrical portion 33, the yokes 42 can be prevented from spreading outwardly in the radial direction due to a centrifugal force which is generated when the rotor 11 rotates at high speeds. Here, since the rotor frame 30 is not cast integrally with the outer ring 50, no ring side mounting hole 51 is formed in the outer ring 50, nor is formed an outward projection 35 in the rotor frame 30.

Also, the first and second molds 80 and 81, which are used to cast the rotor frame 30, are respectively divided by the one-side side surfaces of the yokes 42 in the axial direction, while the molds 80 and 81 respectively include side surfaces 80*a*, 81*a*, 80*b* and 81*b* respectively corresponding to the axial side surfaces of the shaft 55, the axial side surfaces of the yokes 42 and sub magnets 43. Also, the first mold 80 includes an inner peripheral surface 80*e* which corresponds to the outer cylindrical portion 33 of the rotor frame 30. In this case as well, in the radially outer side portions of the respective side surfaces 80*b* and 81*b* corresponding to the axial side surfaces of the yokes 42 and sub magnets 43 of these molds 80 and 81, there are formed stepped portions 82 and 83 which are used to position the laminated member 71 in the radial direction.

The remaining structures and operations of the present embodiment are similar to those of the first embodiment.

<Third Embodiment>

Now, description will be given below of a third embodiment according to the invention with reference to FIGS. 13 and 14. Here, in the drawings, the same composing parts as the first embodiment are given the same designations and thus the duplicate description thereof is omitted here.

Figure 13:
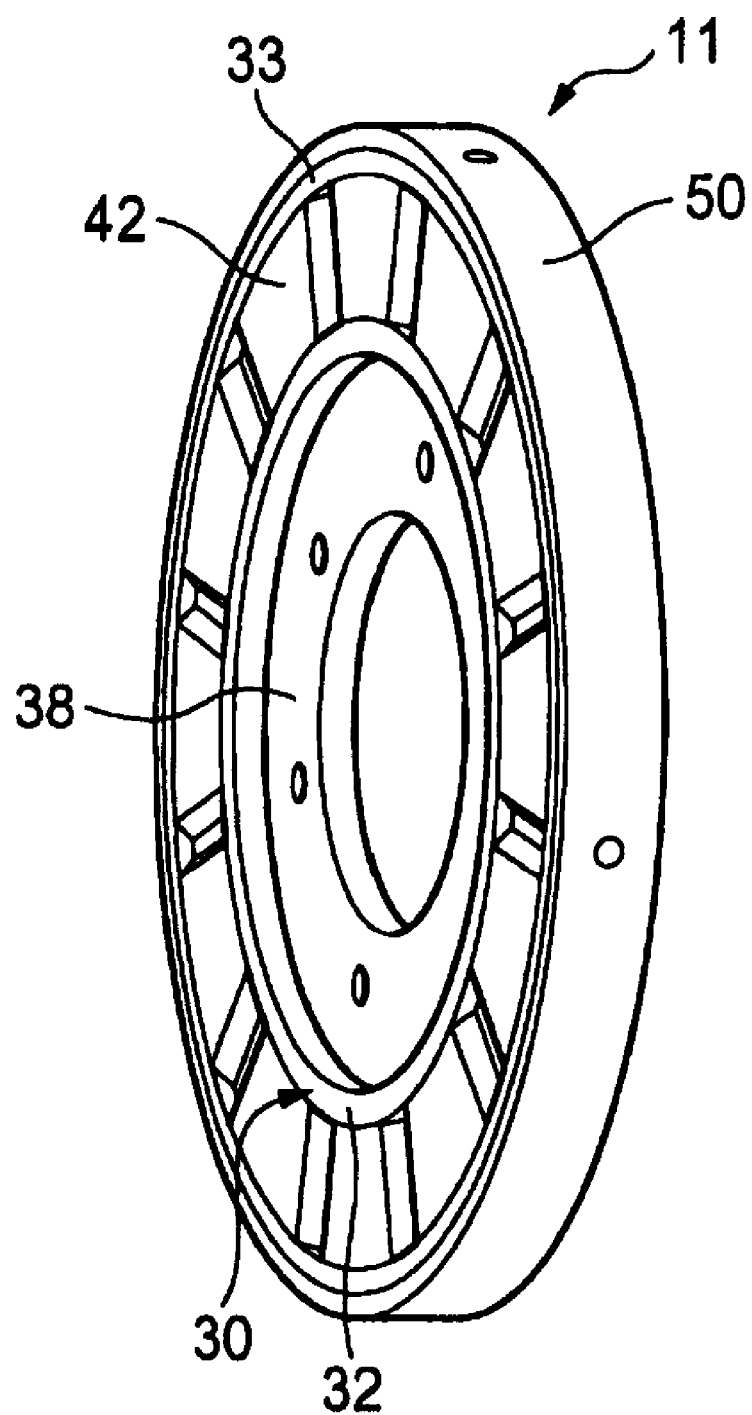
[FIG. 13]
Figure 14:
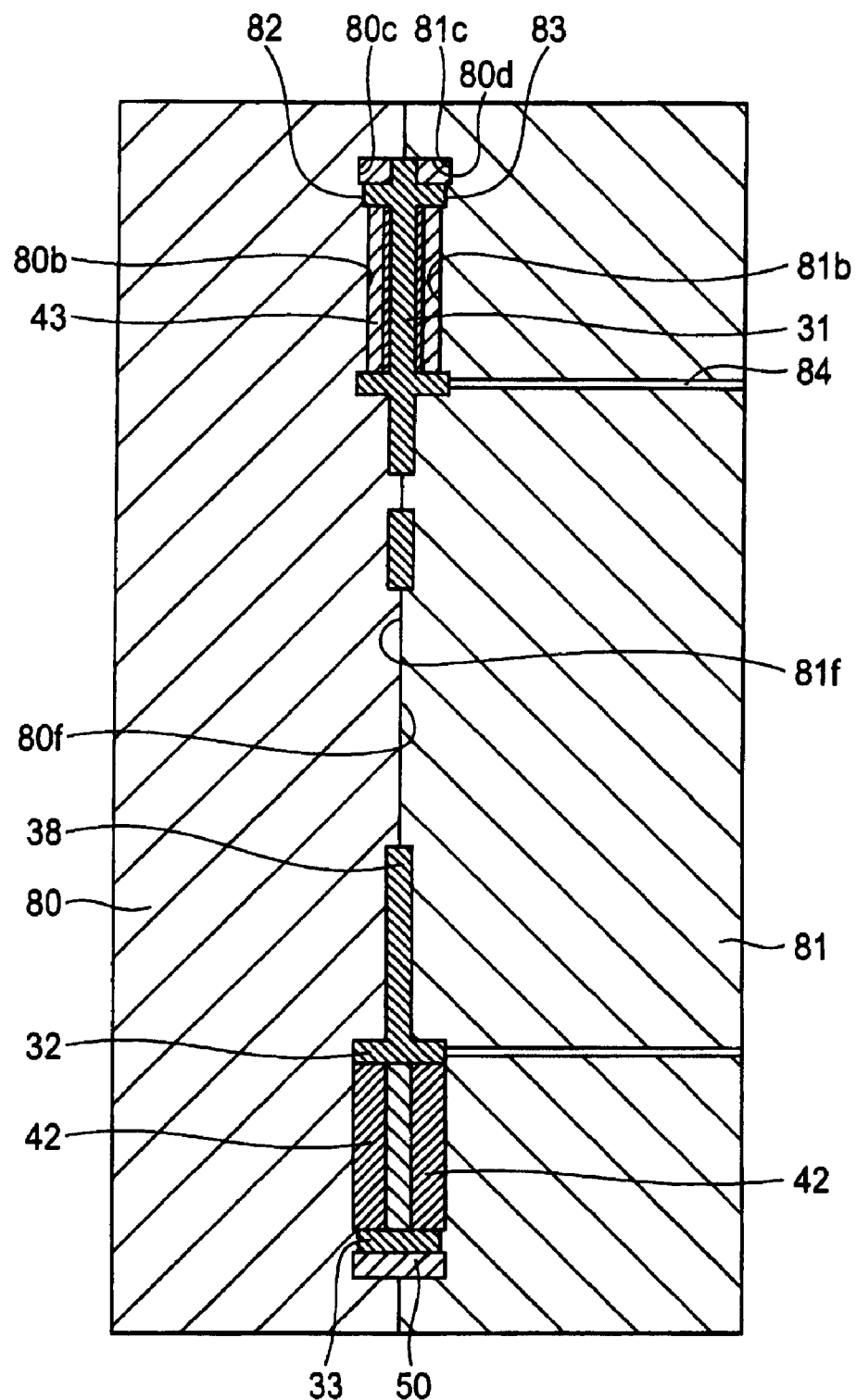
[FIG. 14]

In a rotor 11 according to the present embodiment, as shown in FIGS. 13 and 14, a rotor frame 30 is formed by casting in a state where the laminated member 71 with the main magnets 41, - - -, 41 and sub magnets 43, - - -, 43 inserted therein and the shaft 55 are respectively stored in molds 80 and 81, while a shaft (not shown) formed separately from the rotor frame 30 is fastened and fixed to an inward facing flange 38 which extends from the inner cylindrical portion 32 of the rotor frame 30 toward the radially inner side thereof.

Therefore, the first and second molds 80 and 81, which are used to cast the rotor frame 30, on the radially outside thereof, are respectively divided by the one-side side surfaces of the outer ring 50 and yokes 42 in the axial direction; and, on the radially inside thereof, they are respectively divided by the one-side side surface of an inward facing flange 38 in the axial direction. Also, the first and second molds 80 and 81 respectively include side surfaces 80*f*, 81*f*, 80*b*, 81*b*, 80*c* and 81*c* respectively corresponding to the axial side surface of the inward facing flange 38, the axial side surfaces of the yokes 42 and sub magnets 43, and the axial side surface of the outer ring 50. And, the first mold 80 includes an inner peripheral surface 80*d* which corresponds to the outer peripheral surface of the outer ring 50. In this case as well, in the radially outer side portions of the respective side surfaces 80*b* and 81*b* corresponding to the axial side surfaces of the yokes 42 and sub magnets 43 of these molds 80 and 81, there are formed stepped portions 82 and 83 which are used to position the laminated member 71 in the radial direction.

Therefore, a shaft, which is produced separately from the rotor frame 30, can be mounted onto the rotor frame 30 from behind after it is cast. This eliminates the need for provision of a casting facility with the length of the shaft taken into consideration, thereby being able to reduce the size of such facility.

The remaining structures and operations of the present embodiment are similar to those of the first embodiment.

<Fourth Embodiment>

Figure 15:
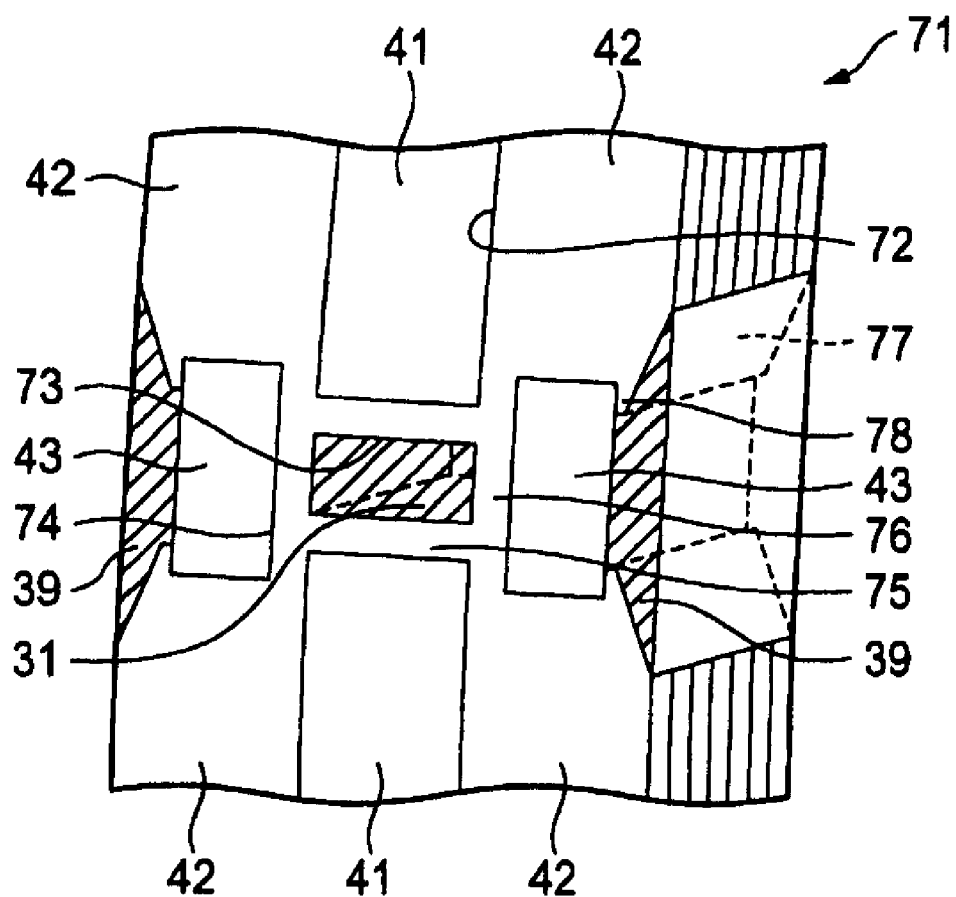
[FIG. 15]
Figure 16:
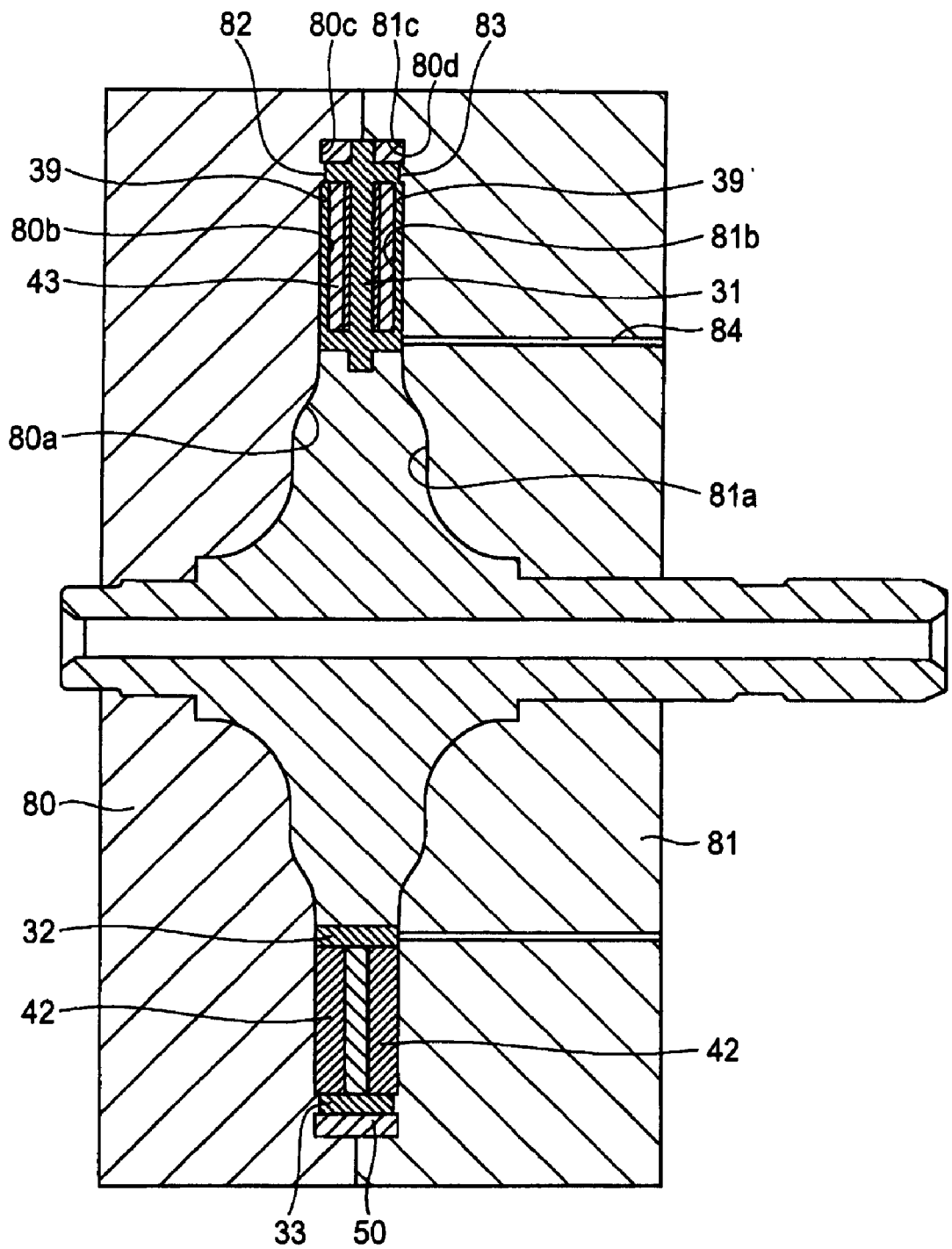
[FIG. 16]

Now, description will be given below of a fourth embodiment according to the invention with reference to FIGS. 15 and 16. Here, in the drawings, the same composing parts as the first embodiment are given the same designations and thus the duplicate description thereof is omitted here.

In a rotor according to the present embodiment, a rotor frame 30 includes sub magnet hold portions 39 which can be formed when a die-cast alloy is poured into spaces respectively formed outside in the axial direction of sub magnets 43. Thus, the axial side surfaces of the rotor 11 are formed such that they are flush with each other in the peripheral direction owing to the side surfaces of the yokes 42 and sub magnet hold portions 39.

Also, in the molds 80 and 81 which are used to cast the rotor frame 30, the side surfaces 80*b* and 81*b* of the molds 80 and 81, which respectively correspond to the axial side surfaces of the yokes 42 and sub magnet hold portions 39, may also be formed flush with each other in the peripheral direction, which can simplify the shapes of the molds 80 and 81. Here, in this case as well, the laminated member 71 is positioned in the peripheral direction with respect to the molds 80 and 81 by the winding start portion 64 and winding end portion 65.

Therefore, according to the rotor 11 of the present embodiment, since the rotor frame 30 includes the sub magnet hold portions 39 which are formed of non-magnetic material poured into the spaces respectively formed outside in the axial direction of sub magnets 43, the position shift of the sub magnets 43 can be prevented without having ill influences on the respective magnetic fluxes of the main magnets 41 and sub magnets 43.

<Fifth Embodiment>

Figure 17:
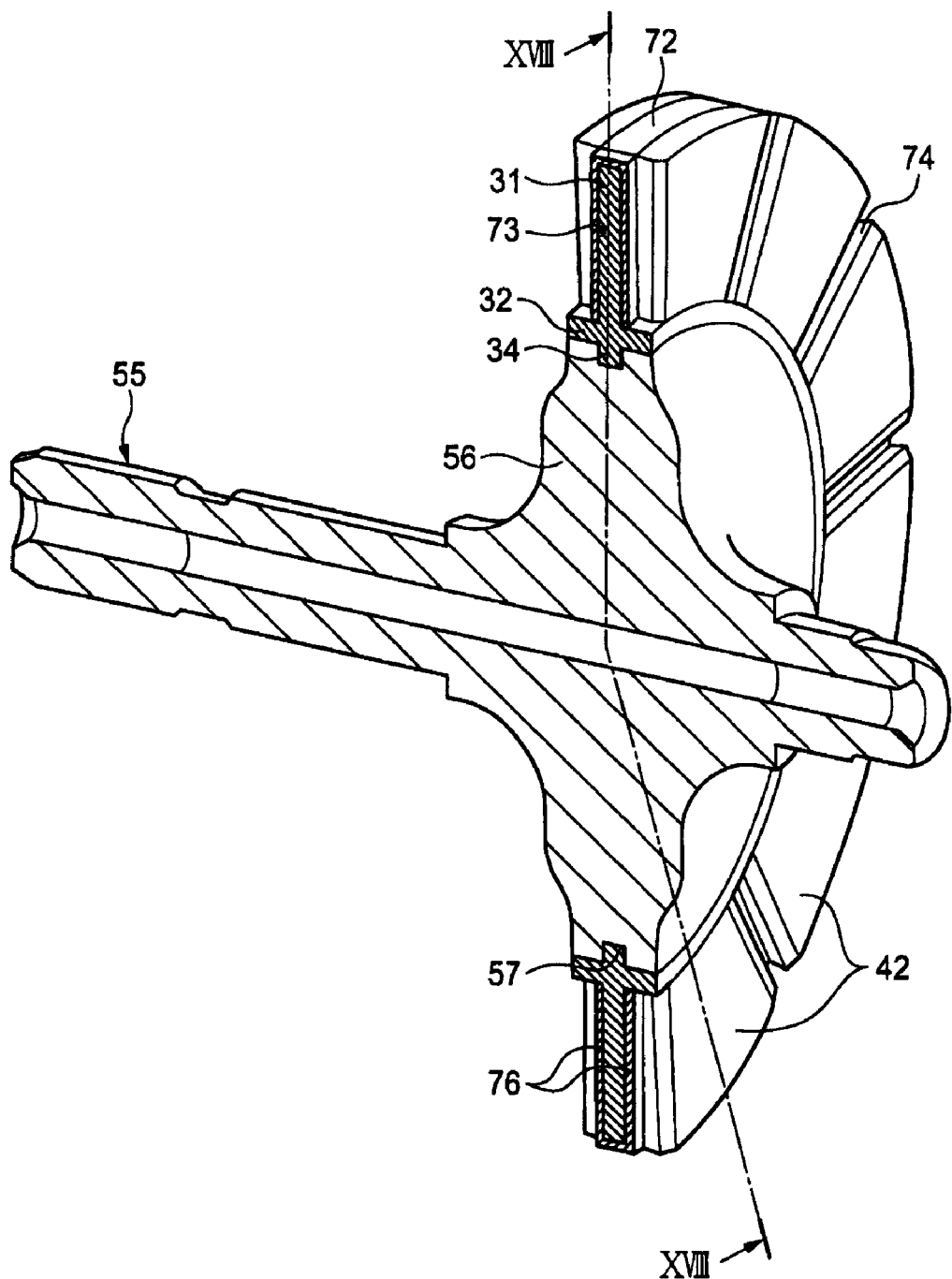
[FIG. 17]
Figure 18:
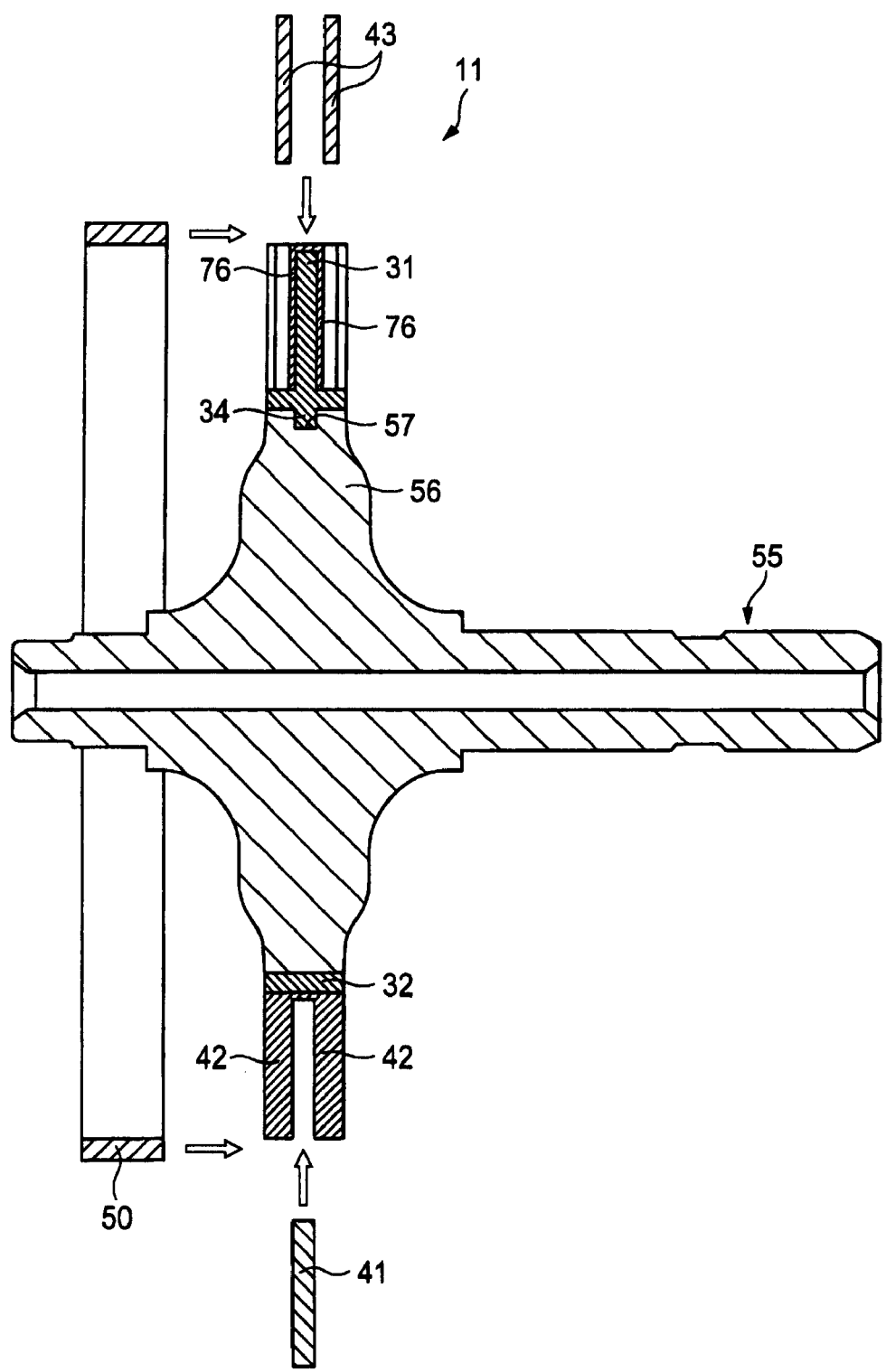
[FIG. 18]

Now, description will be given below of a fifth embodiment according to the invention with reference to FIGS. 17 to 19. Here, in the drawings, the same composing parts as the first embodiment are given the same designations and thus the duplicate description thereof is omitted here.

In a rotor 11 according to the present embodiment, main magnets 41, - - -, 41 and sub magnets 43, - - -, 43 are inserted into a laminated member 71 after a rotor frame 30 and laminated member 71 are unified with each other by casting.

Therefore, in at least one layer of the laminated member 71 when viewed from the most radially inner side of the laminated member 71, there are formed only the rib receiving holes 63 but there are not formed the main magnet receiving holes 61 and sub magnet receiving holes 62; and, in the case of the main magnet inserting holes 72 and sub magnet insertion holes 74 which are formed by winding the laminated member 71, the inner peripheral sides thereof are respectively closed. Also, in at least one layer of the laminated member 71 when viewed from the most radially outer side thereof, there are formed only the main magnet receiving holes 61 and sub magnet receiving holes 62, but there are not formed the rib receiving holes 63; and, in the case of the rib storing holes 73 which are formed by winding and producing the laminated member 71, the outer peripheral sides thereof are closed respectively.

Figure 19:
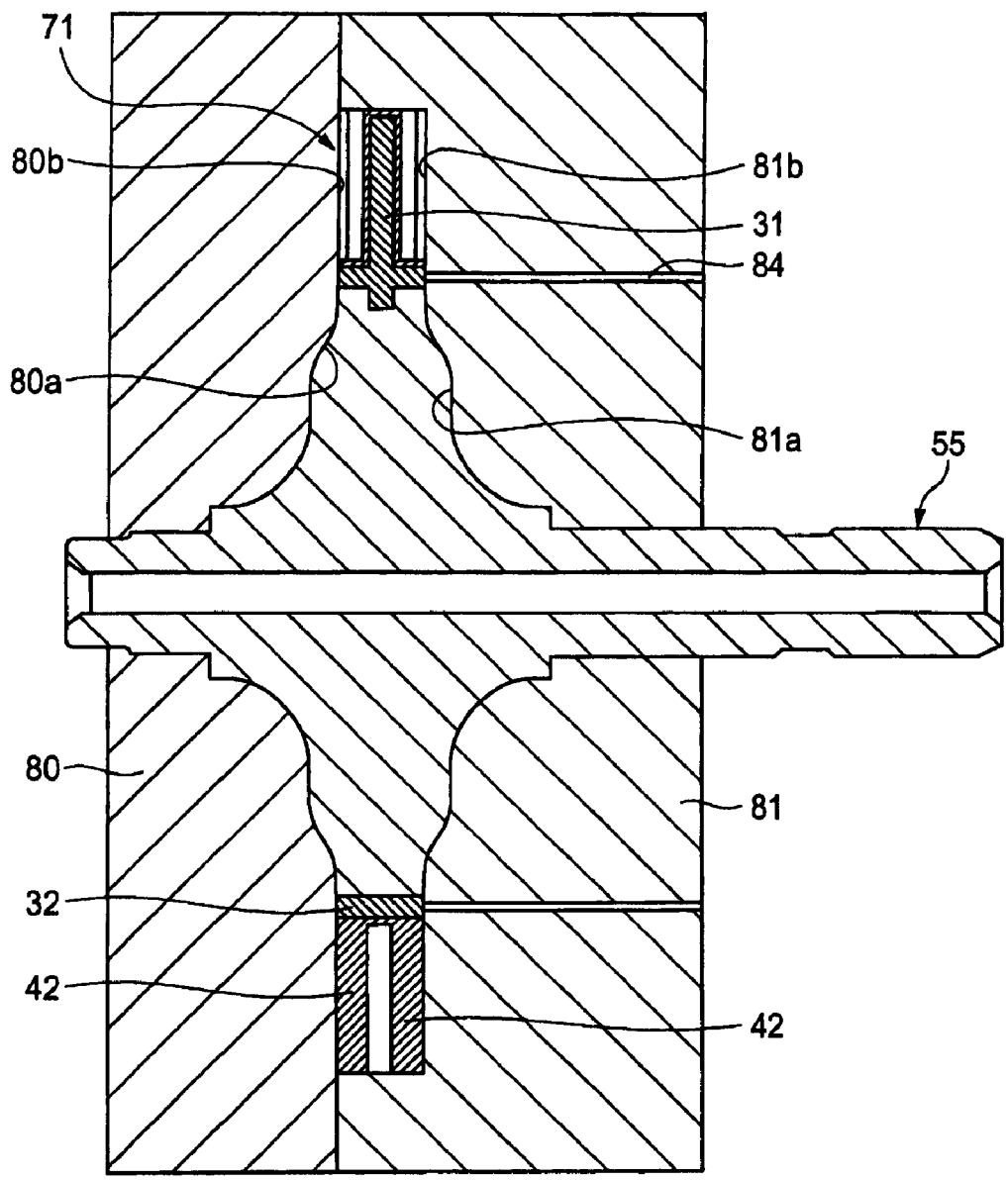
[FIG. 19]

Therefore, as shown in FIG. 19, when, in a state where the thus formed laminated member 71 and shaft 55 are stored in the molds 80 and 81, the rotor frame 30 is cast, the die-cast alloy is prevented from flowing into the radially outside portions of the rib storing holes 73, main magnet inserting holes 72 and sub magnet storing portions 74, whereby there are formed only the plurality of ribs 31, inner cylindrical portions 32 and inward projections 34.

After then, the main magnets 41, - - -, 41 and sub magnets 43, - - -, 43 are inserted into the main magnet inserting holes 72 and sub magnet storing portions 74 from the outer peripheral side respectively, while the outer ring 50 is fixed to the periphery of the laminated member 71 by a force-fitting or a shrink-fitting.

Therefore, according to the axial gap type motor of the present embodiment, in the laminated member 71, the inner peripheral side portions of the main magnet inserting holes 72, the outer peripheral side portions of the rib storing holes 73 and the inner peripheral side portions of the sub magnet storing portions 74 are closed respectively. And, in the rotor frame 30, as it is formed by casting, there are formed a plurality of ribs 31 and an inner cylindrical portion 32. Owing to this, in a state where the main magnets 41 and sub magnets 43 are removed, the yokes 42 can be enveloped by the rotor frame 30 through the casting of the rotor frame 30, which can prevent the degradation of the magnet coercive force due to an increase in the casting temperature in the casting operation. Therefore, the die-cast alloy material can be chosen without worrying about the degradation of the magnet coercive force.

<Sixth Embodiment>

Now, description will be given below of a sixth embodiment according to the invention with reference to FIGS. 20 to 26. Here, in the drawings, the same composing parts as the first embodiment are given the same designations and thus the duplicate description thereof is omitted here.

In an axial gap type motor 10 according to the sixth embodiment of the invention, a shaft 90, which is connected to a rotor 11 and is used to transmit the power given from the rotor 11, is different from that of the first embodiment in the connecting structure thereof that is used to connect together the inner peripheral portion of the inner cylindrical portion 32 of a rotor frame 30 and a flange 91 the diameter of which increases toward the inner cylindrical portion 32 of the rotor frame 30.

Figure 20:
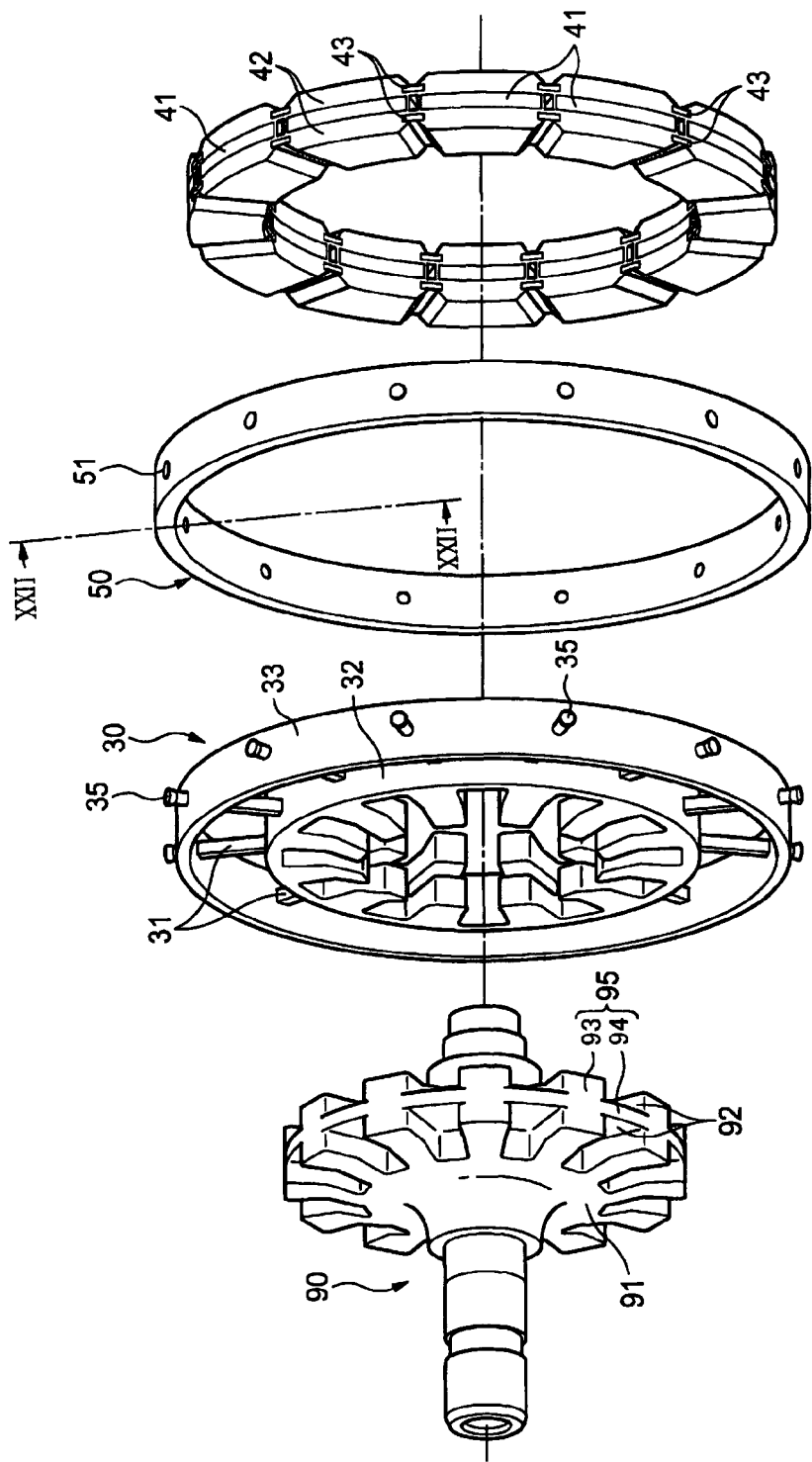
[FIG. 20]
Figure 21A:
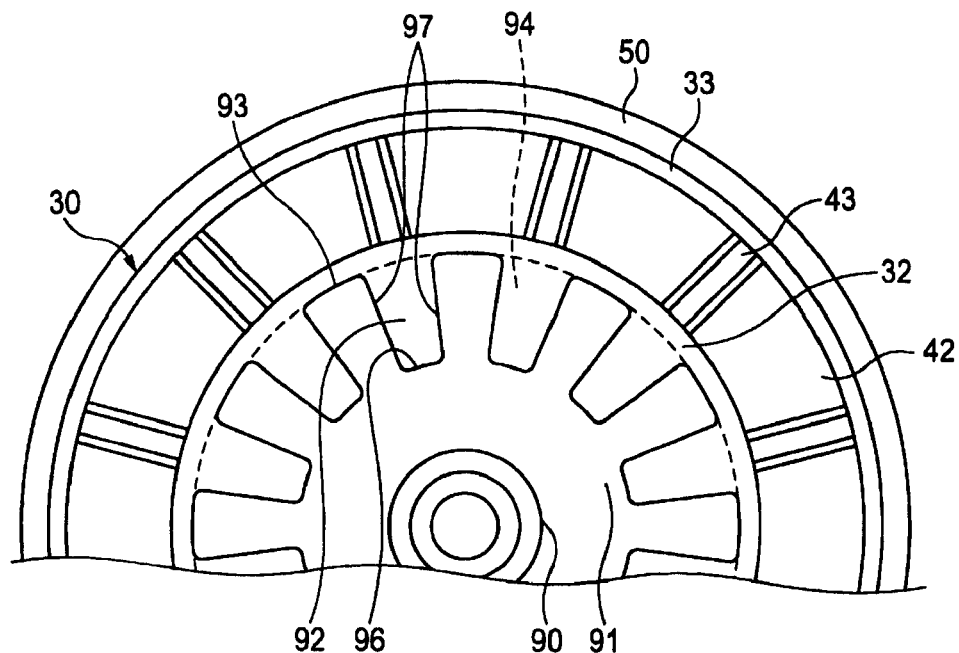
FIG. 21(a) is a partial side view of the rotor and shaft of the motor according to the sixth embodiment.
Figure 21B:
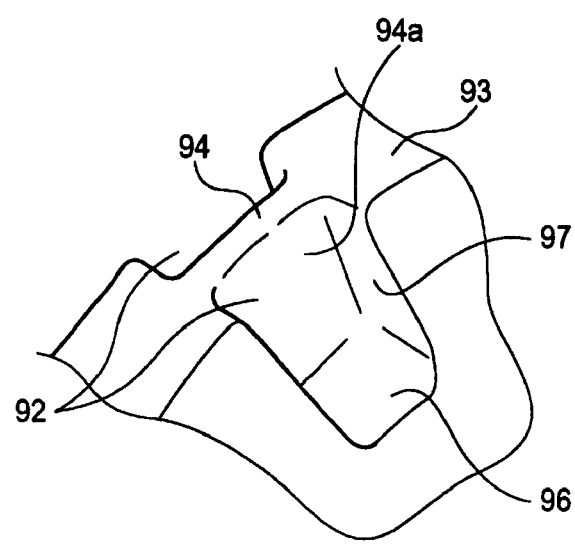
FIG. 21(b) is an enlarged perspective view of the main portions of the shaft.

As shown in FIGS. 20 to 21(b), the connecting surface for connecting together the inner cylindrical portion 32 of the rotor frame 30 and the flange 91 of the shaft 90 has a concavo-convex shape.

That is, the outer peripheral portion of the flange 91 has a substantially gear-like shape due to a plurality of recessed portions 92 formed substantially at regular intervals in the circumferential direction and a plurality of arc surfaces 93 respectively formed between the mutually adjoining recessed portions 92. Also, the flange 91 partially forms the plurality of arc surfaces 93 in the middle portion thereof in the axial direction and also includes a disk portion 95 which forms a plurality of partition walls 94 for separating the respective recessed portions 92 from each other. The plurality of recessed portions 92 are disposed in a paired manner on both sides of their associated partition walls 94 in the axial direction; and, they are defined by a bottom wall 96, a pair of peripheral direction walls 97 opposed to each other in the peripheral direction of the flange 91, and the side surface 94a of the partition wall 94 in the axial direction.

Also, the inner cylindrical portion 32 of the rotor frame 30 includes a circular portion having a given thickness, and the plurality of inward projections 34 of the inner cylindrical portion 32, which are respectively formed on the inner peripheral portion of the circular portion substantially at regular intervals in the circumferential direction on both sides in the axial direction, are respectively fitted into their associated recessed portions 92 by casting.

Figure 22:
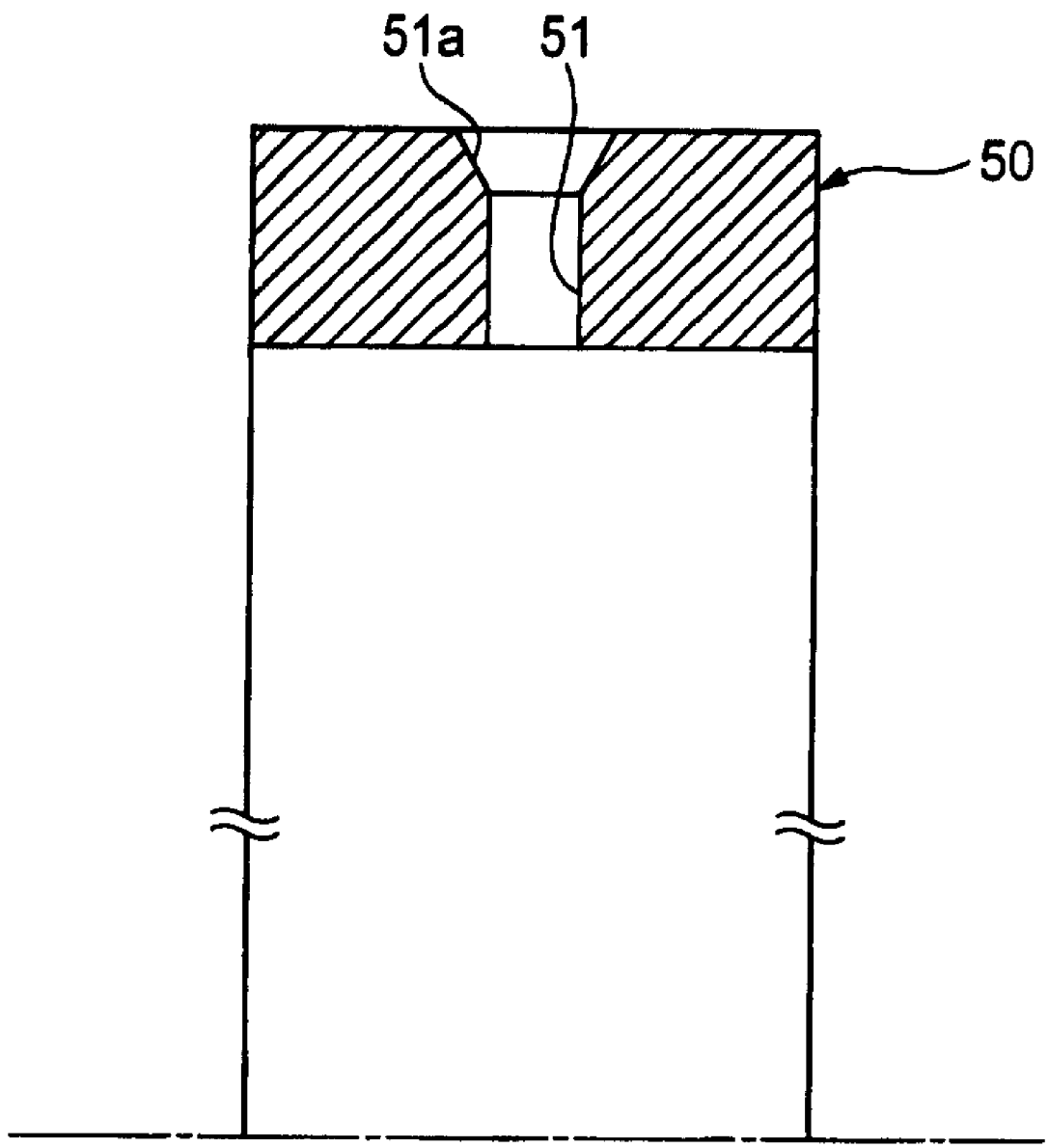
[FIG. 22]
Figure 23:
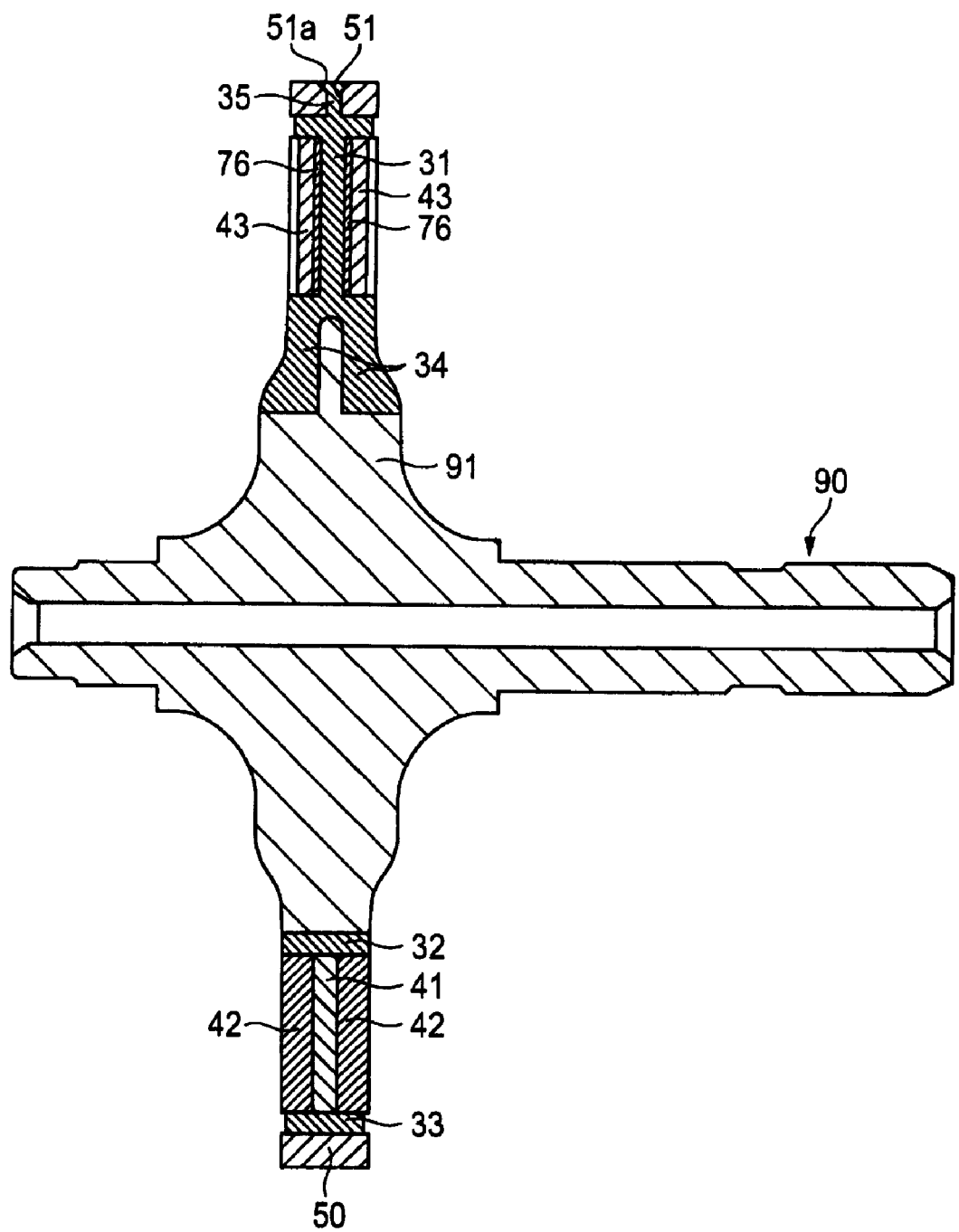
[FIG. 23]

Also, in the outer ring 50, there are formed a plurality of ring side mounting holes 51 which respectively penetrate through the outer ring 50 in the radial direction. Each ring side mounting hole 51 includes, in the portion that exists near to the outer peripheral surface thereof, a tapered portion 51a the diameter of which, as shown in FIG. 22, increases toward the outer peripheral side thereof; and, the hole diameter of the outer peripheral side thereof is larger than that of the inner peripheral side thereof. And, as shown in FIG. 23, a plurality of outward projections 35 which have been formed by casting on the outer peripheral surface of the outer cylindrical portion 33 of the rotor frame 30 enter into these ring side mounting holes 51.

Here, according to the present embodiment, the number of the recessed portions 92 of the shaft 90 and the number of the ring side mounting holes 51 of the outer ring 50 are set equal to the number of the ribs 31 of the rotor frame 30 in order that the recessed portions 92 and ring side mounting holes 51 can be in phase with the ribs 31.

Figure 24:
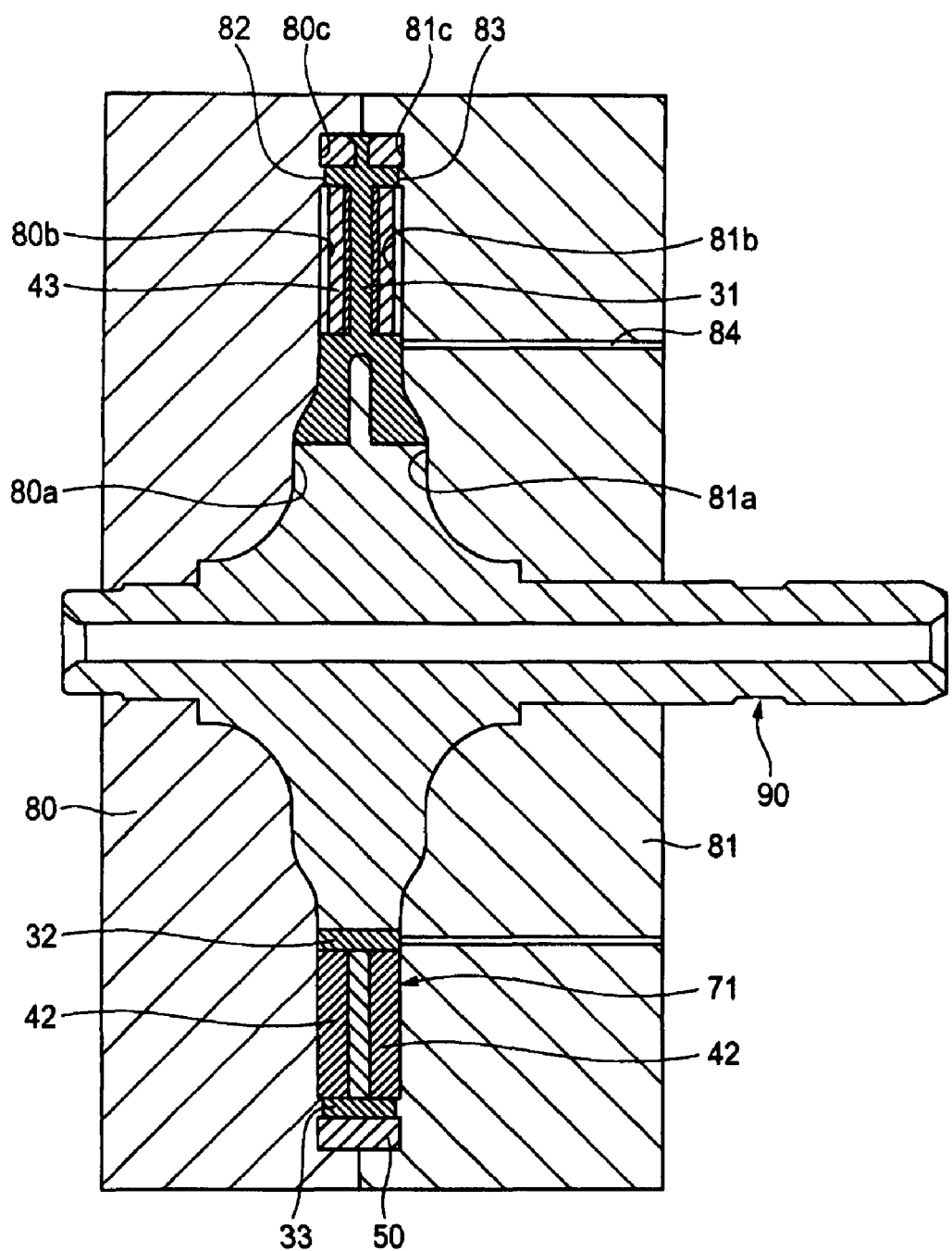
[FIG. 24]

The above structured rotor frame 30 is formed by casting using a non-magnetic die-cast alloy such as an aluminum alloy in a state where, as shown in FIG. 24, the laminated member 71 with the main magnets 41, - - -, 41 and sub magnets 43, - - -, 43 inserted therein, shaft 90 and outer ring 50 are respectively stored in the first and second molds 80 and 81.

The first and second molds 80 and 81 are respectively divided into two in the axial direction, while they respectively include side surfaces 80a, 81a, 80b, 81b, 80c, 81c respectively corresponding to the axial side surfaces of the shaft 90, the axial side surfaces of the yokes 42 and sub magnets 43, and the axial side surfaces of the outer ring 50.

In the radially outer sides of the side surfaces 80b and 81b of the molds 80 and 81 that correspond to the axial side surfaces of the yokes 42 and sub magnets 43, there are formed step portions 82 and 83, while the step portions 82 and 83 are used to position the laminated member 71, into which the main magnets 41, - - -, 41 and sub magnets 43, - - -, 43 have been inserted, in the radial direction. Also, the laminated member 71 is positioned in the peripheral direction using a winding start portion 64 and a winding end portion 65 in order that, in the casting operation, the molten non-magnetic die-cast alloy can be poured smoothly into the recessed portions 92 of the shaft 90 and the ring side mounting holes 51 of the outer ring 50.

Also, the shaft 90 is positioned in the peripheral direction in such a manner that the recessed portions 92 can be disposed in phase with the ribs 31. Therefore, in the molds 80 and 81, there are formed portions which can be contacted with the in-phase portions (not shown) of the recessed portions 92 formed in the shaft 90.

And, in a state where the main magnets 41, - - -, 41 and sub magnets 43, - - -, 43, laminated member 71, shaft 90 and outer ring 50 are positioned and stored in the first and second molds 80 and 81, the first and second molds 80 and 81 are closed and the die-cast alloy is poured from a gate 84 formed in the second mold 81 into a space formed between the two molds 80 and 81. The gate 84 is formed such that it opens at a radial direction position corresponding to the inner cylindrical portion 32 of the rotor frame 30. Therefore, after the die-cast alloy poured from the gate 84 flows into a space constituting the inner cylindrical portion 32, it passes through rib storing holes 73 formed in the laminated member 71 and flows into a space constituting the outer cylindrical portion 33. The die-cast alloy further flows into the recessed portions 92 of the shaft 90 and the ring side mounting holes 51 of the outer ring 50 as well. Thus, there is formed the rotor frame 30 by casting which includes the ribs 31, inner cylindrical portion 32, outer cylindrical portion 33, inward projections 34 and outward projections 35.

Especially, the die-cast alloy, which has flowed into the plurality of recessed portions 92 formed in the flange 91 of the shaft 90, forms the plurality of inward projections 34 respectively extending inwardly from the inner cylindrical portion 32. Therefore, the mutually connected surfaces of the recessed portions 92 and inward projections 34 provide a concavo-convex shape. This can prevent the shaft 90 from shaking or shifting in position in the circumferential direction, thereby being able to fix together the rotor frame 30 and shaft 90 firmly.

Also, the die-cast alloy having flown into the ring side mounting holes 51 of the outer ring 50, due to the tapered portions 51a formed in the respective mounting holes 51, forms the outward projections 35 which respectively extend along the shapes of the tapered portions 51a and also which are larger in diameter on the radially outer side thereof. This can prevent the deformation of the outer ring 50 due to a centrifugal force generated in the high speed rotation of the motor 10.

Thus, in the axial gap type motor 10 and the method for manufacturing the rotor of such motor 10 according to the present embodiment, the rotor 11 includes: a plurality of main magnets 41, - - -, 41 magnetized in the axial direction and disposed at predetermined intervals in the peripheral direction; a plurality of yokes 42, - - -, 42 respectively disposed on both sides of the plurality of main magnets 41, - - -, 41 in the axial direction; a plurality of ribs 31, - - -, 31 respectively interposed between the main magnets 41, - - -, 41 adjoining each other in the peripheral direction, and respectively extending in the radial direction; and, an inner cylindrical portion 32 and an outer cylindrical portion 33 respectively disposed on the radially inner side of the plurality of ribs 31, - - -, 31 and on the radially outer side thereof. And, the rotor frame 30 is formed of the die-cast alloy by casting, while the connecting surface for connecting together the inner cylindrical portion 32 of the rotor frame 30 and shaft 90 has a concavo-convex shape. This can facilitate the operation to assemble the rotor frame 30 to the shaft 90. Also, when fixing the yokes 42, - - -, 42, which are formed by the laminated member 71 produced by winding, to the shaft 90 through the rotor frame 30, the rotor frame 30 and shaft 90 can be firmly fixed to each other, whereby the shaft 90 and rotor frame 30 can be prevented from shaking or shifting in position relative to each other in the circumferential direction when the rotor 11 rotates at a high speed.

Also, since the shaft 90 includes the flange 91 the diameter of which increases toward the inner cylindrical portion 32 of the rotor frame 30, the thickness of the inner cylindrical portion 32 can be reduced, thereby being able to reduce the occurrence of casting cavities (shrinkage cavities, winding cavities).

Also, according to the present embodiment, the outer peripheral portion of the flange 91 includes the plurality of recessed portions 92 formed substantially at regular intervals in the circumferential direction, while the inner cylindrical portion 32 of the rotor frame 30 formed by casting includes the plurality of inward projections 34 which can be fitted into their associated a plurality of recessed portions 92. This structure can prevent the flange 91 and inner cylindrical portion 32 from shaking or shifting in position relative each other in the circumferential direction.

Further, the outer peripheral portion of the flange 91 has a substantially gear-like shape owing to the plurality of recessed portions 92 and a plurality of arc surfaces 93 which are respectively interposed between the mutually adjoining recessed portions 92. And, the flange 91 includes, in the axial direction intermediate portion thereof, a disk portion 95 in which there are formed the plurality of arc surfaces 93 partially and also in which there are formed a plurality of partition walls 94 respectively separating the mutually adjoining recessed portions 92 from each other. Therefore, the substantially gear-like shape makes it possible to set uniform connecting surfaces which have no influence on the rotation of the rotor, and also the partition walls 94 can prevent the shaft 90 from shaking or shifting in position in the axial direction due to a magnetic suction force or the like given from the stator 12.

Also, each recessed portion 92 includes a partition wall 94 which is formed in the axial direction middle portion of the recessed portion. The flange 91 includes a plurality of pairs of recessed portions 92 respectively formed on both sides in the axial direction. Here, each recessed portion is defined by a bottom portion 96, a pair of peripheral direction walls 97 disposed opposed to each other in the peripheral direction of the flange 91, and the axial side surface 94a of the partition wall 94. Therefore, the partition walls 94 and paired recessed portions 92 existing respectively on both sides in the axial direction can prevent the flange 91 from shaking or shifting in position in the axial direction due to a magnetic suction force given from the stator 12 or due to a similar force.

Also, the rotor 11 further includes an outer ring 50 in which there can be formed a plurality of ring side mounting holes 51. Here, the plurality of ring side mounting holes 51 respectively extend in the radial direction of the outer ring 50 and also have a hole diameter which is larger on the outer peripheral side thereof than on the inner peripheral side thereof. The rotor frame 30 includes an outer cylindrical portion 33 disposed on the radially outer side of the plurality of ribs 31, and a plurality of outward projections 35 which are respectively projected from the outer peripheral surface of the outer cylindrical portion 33 and enter into their associated ring side mounting holes 51 of the outer ring 50. Thanks to this structure, the outer ring 50 can be formed integrally with the rotor frame 30 by casting without pressure inserting the outer ring 50 into the rotor frame 30, which eliminates the need for the operation to pressure insert the outer ring 50 into the rotor frame 30, thereby being able to simplify the rotor manufacturing process. Also, since the relative position shift of the outer ring 50 in the radial direction with respect to the rotor frame 30 due to variations in the temperature can be prevented, it is possible to prevent the yokes 42 and main magnets 41 against removal due to a centrifugal force generated when the rotor 11 rotates at high speeds.

Figure 25:
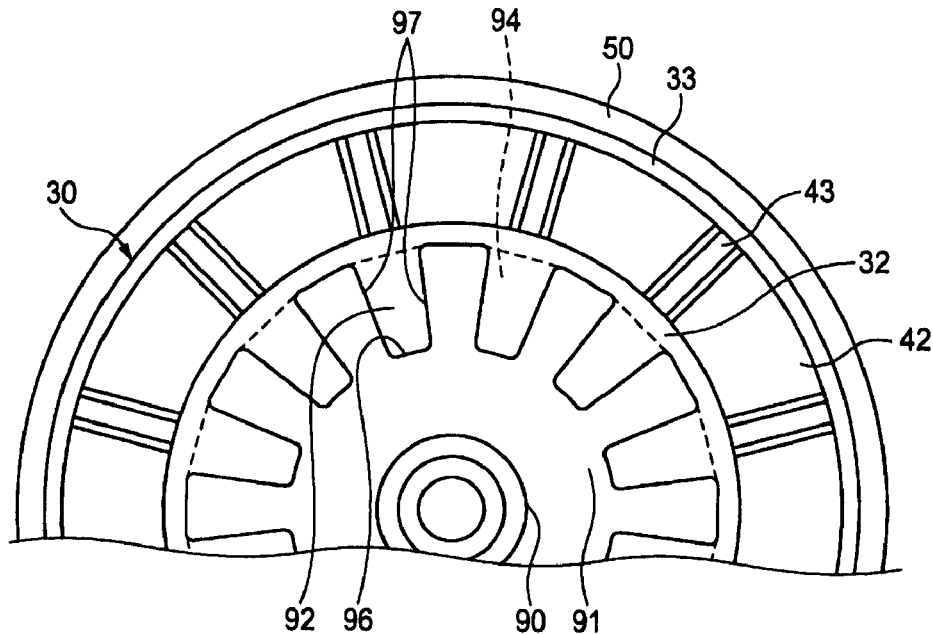
[FIG. 25]

Here, according to the present embodiment, referring to the shape of the outer peripheral portion of the shaft 90, instead of the disk portion 95, as shown in FIG. 25, there may also be formed a polygonal flat plate portion in which the outer surfaces thereof corresponding to the intermediate portions between the mutually adjoining recessed portions 92 and the outer surfaces of the partition walls 94 are respectively formed as plane surfaces.

Figure 26:
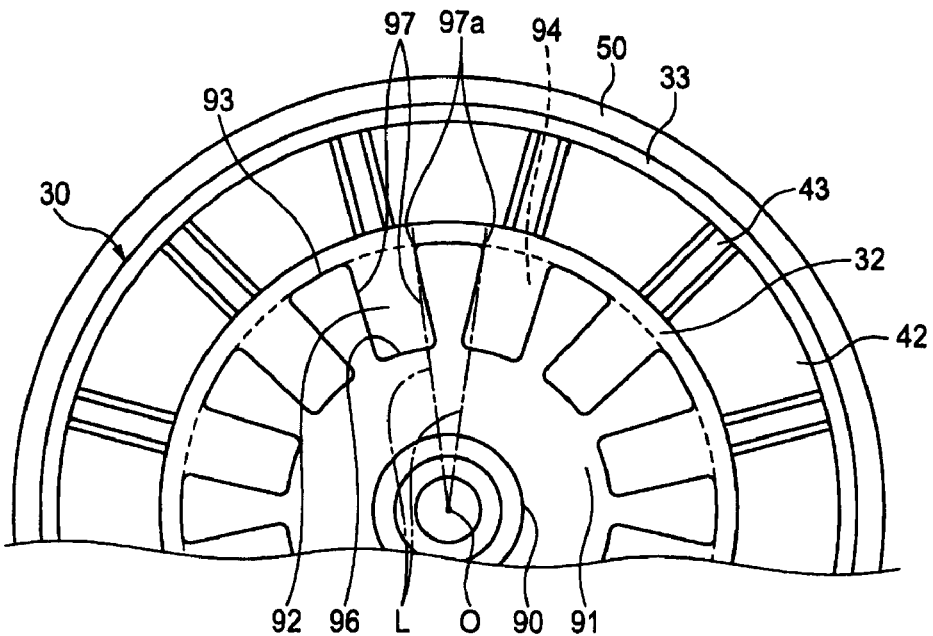
[FIG. 26]

Also, the recessed portion 92 may also be formed such that, as shown in FIG. 26, the two paired bottom walls 96, when viewed from the lateral side thereof, respectively cross two virtual lines L which connect together the center O of the shaft 90 and the radially outer side edge portions 97a of the two paired peripheral direction walls 97. In this case, the inward projections 34 of the rotor frame 30, which is formed by casting, can be prevented further effectively from being deformed in the radial direction of the shaft 90, thereby being able to prevent the rotor frame 30 from shaking due to a centrifugal force generated when the rotor rotates at a high speed.

<Seventh Embodiment>

Now, description will be given below of a seventh embodiment according to the invention with reference to FIGS. 27(a) to 28. Here, in these figures, the composing parts thereof having the same structures as in the sixth embodiment are given the same designations and thus the duplicate description thereof is omitted here.

Figure 27A:
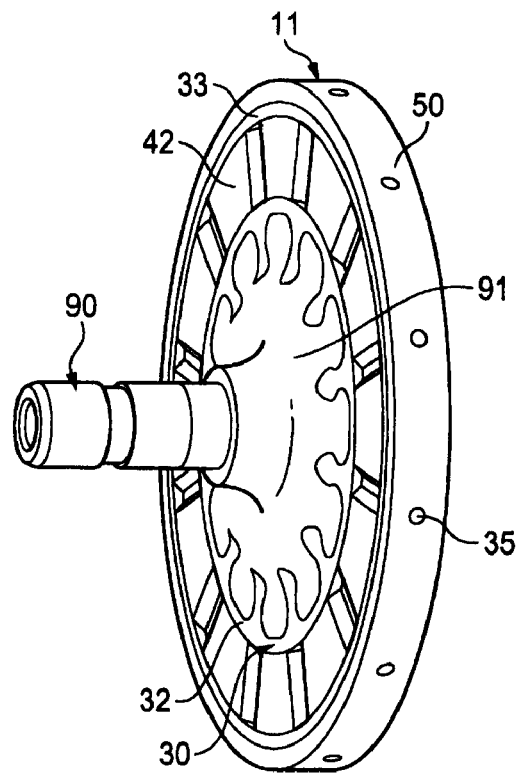
FIG. 27(a) is a perspective view of a rotor used in an axial type gap motor according to a seventh embodiment of the invention.
Figure 27B:
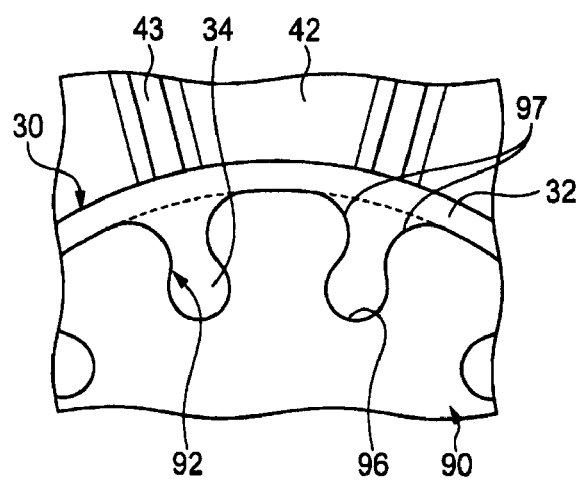
FIG. 27(b) is a partial side view thereof.
Figure 28:
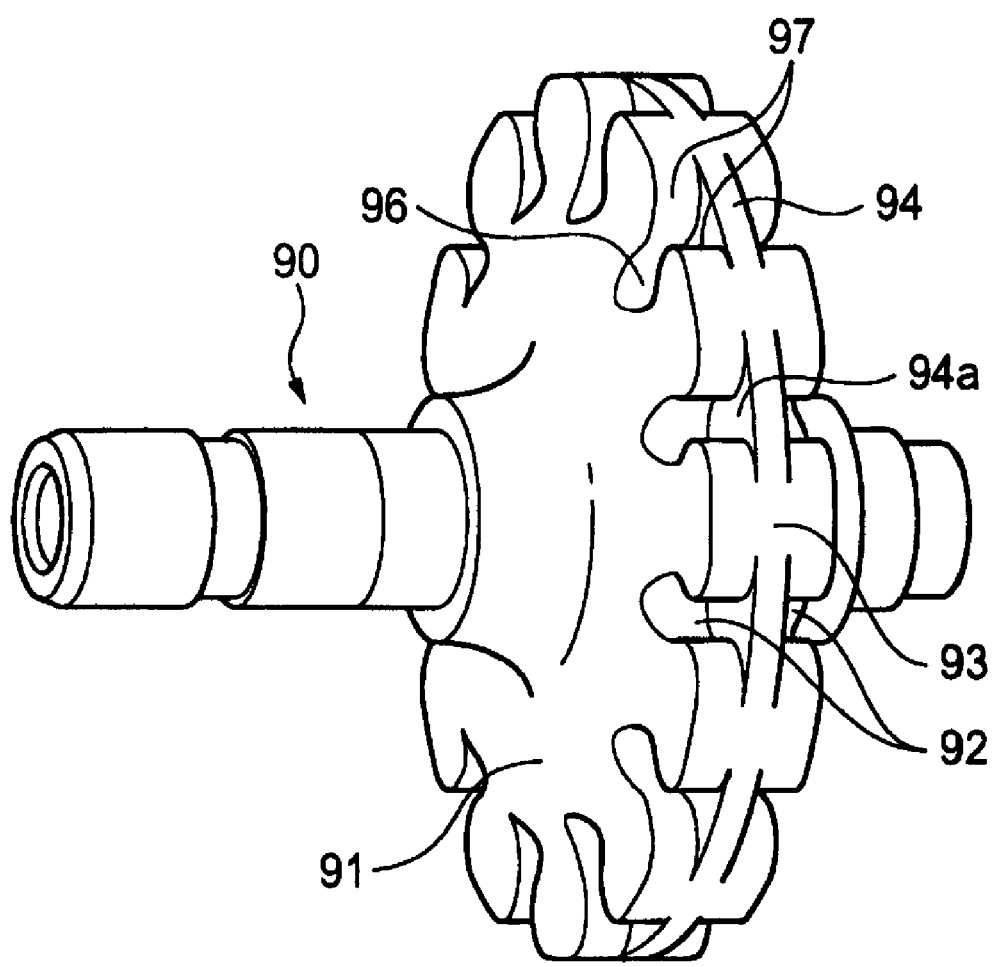
[FIG. 28]

In an axial gap type motor according to the seventh embodiment, as shown in FIGS. 27(a) to 28, each of recessed portions 92 respectively formed in the shaft 90 is formed to have a dovetail groove shape. Specifically, each recessed portion 92 includes a portion in which an arc distance between a pair of peripheral direction walls 97 is larger on the radially inside of the recessed portion 92 than on the radially outside thereof; and also, in each recessed portion 92, a bottom wall 96 and two peripheral direction walls 97 are continuously connected together through curved surfaces. Therefore, in the inner cylindrical portion 32 of the rotor frame 30, there is formed by casting an inward projection 34 which corresponds to the recessed portion 92 formed in a dovetail groove shape. And, similarly to the sixth embodiment, the connecting surface between the inner cylindrical portion 32 of the rotor frame 30 and shaft 90 has a concavo-convex shape.

Therefore, similarly to the seventh embodiment, in the case that the yokes 42, - - -, 42, which are structured by the laminated member 71 produced by winding, are fixed to the shaft 90 through the rotor frame 30, the rotor frame 30 and shaft 90 can be firmly fixed to each other. Also, the present embodiment can prevent the shaft 90 and rotor frame 30 from shaking or shifting in position with respect to each other in the circumferential direction when the rotor 11 rotates at a high speed, and also can prevent them from shaking or shifting in position with respect to each other due to a centrifugal force generated when the rotor 11 rotates at a high speed. Also, since a pair of inward projections 34 are formed in such a manner that they hold the partition wall 94 of the shaft 90 from both sides in the axial direction, the shaft 90 and rotor frame 30 can be prevented from shaking or shifting in position with respect to each other in the axial direction.

The other remaining structures and operations of the present embodiment are similar to those of the sixth embodiment.

<Eighth Embodiment>

Now, description will be given below of an eighth embodiment according to the invention with reference to FIGS. 29(a) to 30. Here, in these figures, the composing parts thereof having the same structures as in the sixth embodiment are given the same designations and thus the duplicate description thereof is omitted here.

Figure 29A:
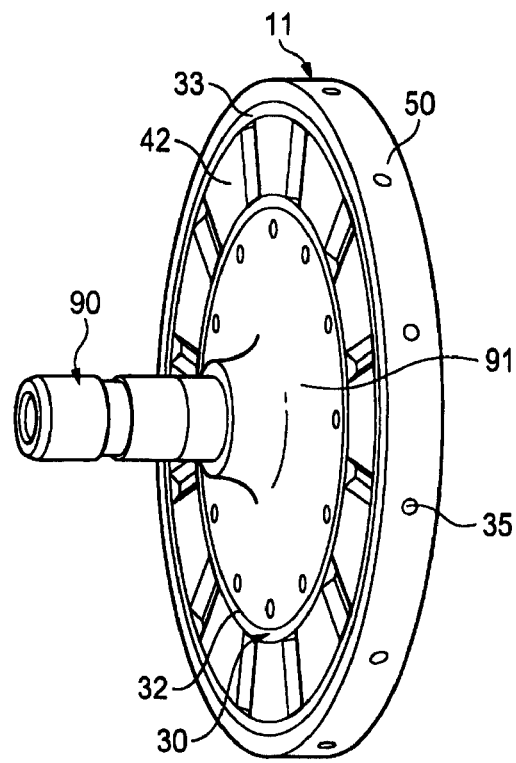
FIG. 29(a) is a perspective view of a rotor used in an axial type gap motor according to an eighth embodiment of the invention.
Figure 29B:
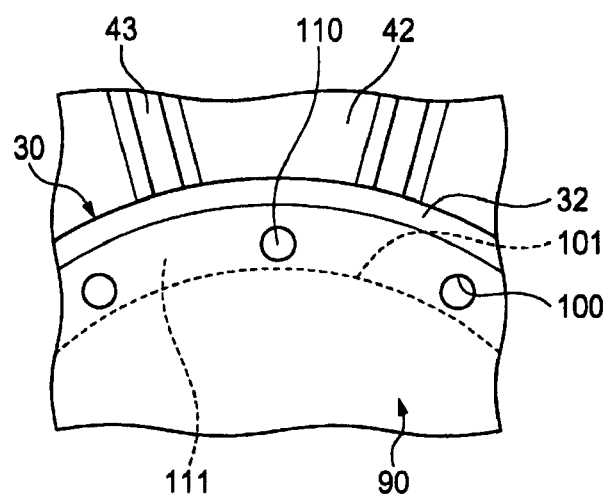
FIG. 29(b) is a partial side view thereof.
Figure 30:
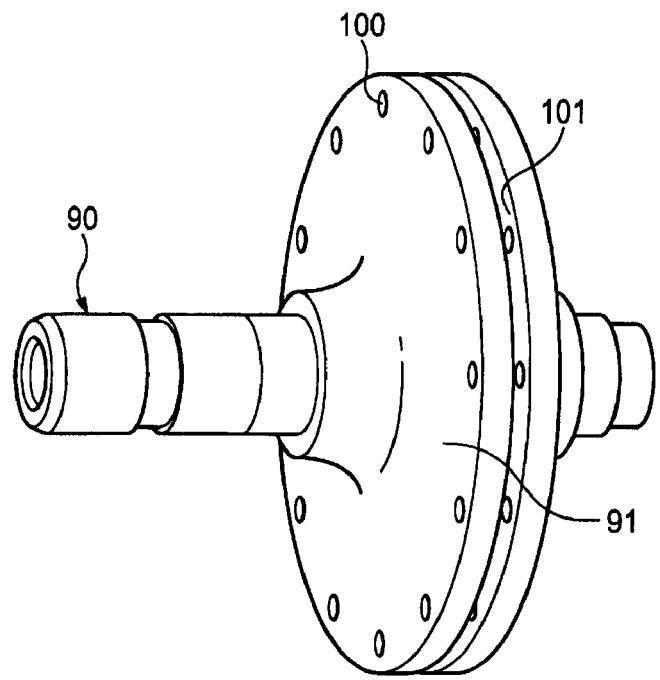
[FIG. 30]
Figure 31:
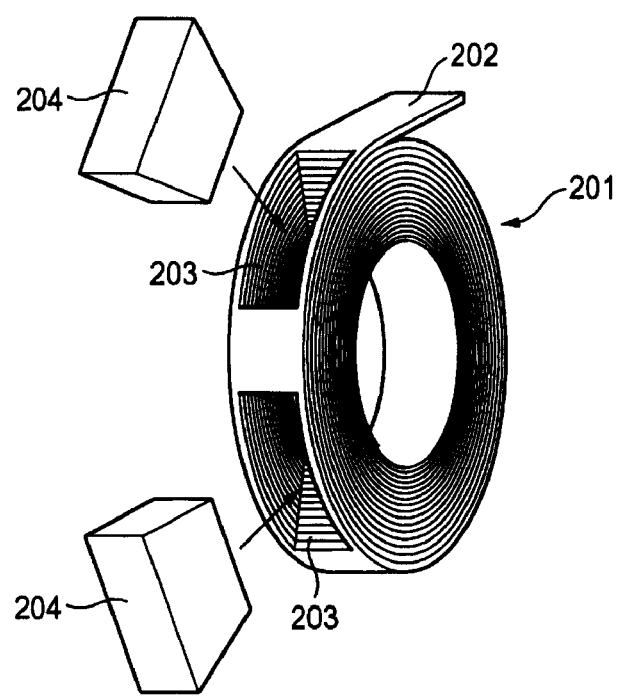
[FIG. 31]

In an axial gap type motor according to the seventh embodiment, as shown in FIGS. 29(a) to 30, the flange 91 of the shaft 90 includes a plurality of shaft side axial holes 100 for a rotor frame which are respectively formed at positions near to the outer peripheral surface of the flange 91, and also a circular recessed groove 101 which is formed in the axial direction intermediate portion of the outer peripheral surface of the flange 91 and is in communication with these shaft side axial holes 100.

Accordingly, in the inner cylindrical portion 32 of the rotor frame 30, by casting, there are provided a plurality of axial projections 110 which respectively enter into their associated shaft side axial holes 100, and a circular projection 111 which is allowed to communicate with the axial projections 110 and enters into the recessed groove 101. Similarly to the sixth embodiment, the connecting surface between the inner cylindrical portion 32 of the rotor frame 30 and shaft 90 has a concavo-convex shape.

Therefore, similarly to the first embodiment in which the plurality of recessed portions 92 are formed in the outer peripheral portion of the flange 91, when the yokes 42, - - -, 42 structured by the laminated member 71 produced by winding are fixed to the shaft 90 through the rotor frame 30, the rotor frame 30 and shaft 90 can be firmly fixed to each other. Especially, since the axial projections 110 of the rotor frame 30 enter into their associated shaft side axial holes 100 by casting, the rotor frame 30 and shaft 90 can be prevented from shaking or shifting in position with respect to each other in the circumferential direction and in the radial direction. Also, sine the circular projection 111 of the rotor frame 30 enters into the circular recessed groove 101 of the flange 91 by casting, the rotor frame 30 and shaft 90 can be prevented from shaking or shifting in position with respect to each other in the axial direction as well.

The other remaining structures and operations of the present embodiment are similar to those of the sixth embodiment.

Here, the invention is not limited to the above-mentioned respective embodiments but the invention can be changed properly without departing from the subject matter of the invention.

For example, in the above respective embodiments, there may also be provided the stator 12 only on one side in the rotational axis O direction, and there may be provided a back yoke on the other side that is not opposed to the stator 12.

Also, in the rotor frame according to the sixth to eighth embodiments, there may be employed a structure which includes at least a plurality of ribs 31 and an inner cylindrical portion 32 that are respectively formed by casting. For example, there may be employed a structure in which the outer peripheral side of the ribs 31 is tightly closed by the laminated member 71 to thereby exclude an outer cylindrical portion. In this case, after formation of the rotor frame 30, the main magnets 41 and sub magnets 43 may be inserted and the outer ring 50 may be then fitted with the outer surface of the rotor frame 30.

The present invention is based on a Japanese Patent Application (Patent Application 2008-308689) filed on Dec. 3, 2008 and on a Japanese Patent Application (Patent Application 2009-026199) filed on Feb. 6, 2009, and thus the contents thereof are incorporated herein for reference.

[Description of Reference Numerals and Signs]
10: Axial gap type motor
11: Rotor
12: Stator
30: Rotor frame
31: Rib
32: Inner cylindrical portion
33: Outer cylindrical portion
34: Inward projection
35: Outward projection
36, 37: Step portion
39: Sub magnet hold portion
41: Main magnet
42: Yoke
43: Sub magnet
50: Outer ring
51: Ring side mounting hole
55: Shaft
56: Flange
57: Shaft side mounting hole
71: Laminated member
72: Main magnet inserting hole
73: Rib storing hole
74: Sub magnet storing portion
80: First mold
81: Second mold
82, 83: Step portion
90: Shaft
91: Flange
92: Recessed portion
100: Shaft side axial hole
101: Recessed groove
110: Axial projection
111: Circular projection
O: Rotational axis

The invention claimed is:

1. An axial gap motor comprising:
a rotor rotatable around a rotational axis; and
a stator disposed to be opposed to the rotor from at least one side of an axial direction of the rotational axis,
wherein the rotor includes:
a plurality of main magnets respectively magnetized in the axial direction and disposed at predetermined intervals in a peripheral direction of the rotor;
a plurality of yokes structured by a laminated member produced by winding a tape-shaped electromagnetic steel plate and respectively disposed on the plurality of main magnets on said at least one side of the axial direction; and
a rotor frame including a plurality of ribs respectively disposed between the main magnets adjoining each other in the peripheral direction and extending in a radial direction of the rotor and at least one of an inner cylindrical portion and an outer cylindrical portion respectively disposed on an radially inner side of the ribs and on an radially outer side of the ribs, and being made of a die-cast alloy,
wherein the rotor further comprises a plurality of sub magnets respectively interposed between the yokes adjoining each other in the peripheral direction and respectively disposed in a plurality of sub magnet storing portions of the laminated member respectively formed inwardly of axial side surface of the yokes, the plurality of sub magnets respectively being magnetized in a direction perpendicular to the axial direction and the radial direction, and
wherein the rotor frame further comprises sub magnet hold portions that respectively make contact with the sub magnets from sides of the axial side surfaces of the yokes.

2. The axial gap motor according to claim 1, wherein a step portion for a winding start portion or a winding end portion of the laminated member to be fixed, is formed on the inner cylindrical portion and the outer cylindrical portion, and
an inner peripheral surface and an outer peripheral surface of the laminated member structuring the plurality of yokes are respectively situated substantially on a concentric circle.

3. The axial gap motor according to claim 1, further comprising:
a shaft for transmitting power given from the rotor and including a shaft side mounting hole formed on an outer peripheral surface of the shaft,
wherein the rotor frame includes an inward projection that enters into the shaft side mounting hole of the shaft.

4. A method of manufacturing a rotor of an axial gap motor, the axial gap motor comprising:
a rotor that is rotatable around a rotational axis and includes a plurality of main magnets respectively magnetized in an axial direction and disposed at predetermined intervals in a peripheral direction, a plurality of yokes respectively disposed on at least one side of the plurality of main magnets in the axial direction, and
a rotor frame having a plurality of ribs respectively disposed between the main magnets adjoining each other in the peripheral direction and extending in the radial direction and at least one of an inner cylindrical portion and an outer cylindrical portion respectively disposed on a radially inner side of the plurality of ribs and on a radially outer side of the ribs; and a stator disposed to be opposed to the rotor from at least said one side in the axial direction, the method comprising:
forming a laminated member structuring the plurality of yokes by winding a tape-shaped electromagnetic steel plate; and
forming the rotor frame by casting a die-cast alloy into a mold, in a state where the laminated member is positioned in the mold,
wherein the rotor further includes a plurality of sub magnets respectively interposed between the yokes adjoining each other in the peripheral direction and respectively disposed in a plurality of sub magnet storing portions of the laminated member respectively formed inwardly of the axial side surfaces of the yokes, and
forming the rotor frame by casting such that the die-cast alloy is poured into spaces that are formed in an axially outside portion of the sub magnets and respectively make contact with the sub magnets from sides of the axial side surfaces of the yokes, in a state where the plurality of sub magnets are inserted into the laminated member, in the step of forming the rotor frame.

5. The method of manufacturing a rotor of an axial gap motor according to claim 4, the method further comprising:

forming step portion for a winding start portion or a winding end portion of the laminated member to be fixed in said one of the inner cylindrical portion or the outer cylindrical portion of the rotor frame, in the step of forming the rotor frame, wherein an inner peripheral surface and an outer peripheral surface of the laminated member structuring the plurality of yokes are respectively situated substantially on a concentric circle.

6. The method of manufacturing a rotor of an axial gap motor according to claim 4, wherein the rotor further includes an outer ring having a ring side mounting hole in an inner peripheral surface of the outer ring, the method further comprising:

forming the rotor frame by casting such that the die-cast alloy is poured into the ring side mounting hole of the outer ring, in the step of forming the rotor frame.

7. The method of manufacturing a rotor of an axial gap motor according to claim 4, the method further comprising:

forming the rotor frame by casting in a state where the plurality of main magnets are inserted into the laminated member, in the step of forming the rotor frame.

8. The method of manufacturing a rotor of an axial gap motor according to claim 4, wherein the laminated member includes main magnet inserting holes for inserting the main magnets thereto, the method further comprising:

setting lengths of the main magnet inserting holes in the axial direction substantially equal to those of the main magnets, and setting lengths of the main magnet inserting holes in the peripheral direction to be larger than those of the main magnets.

9. The method of manufacturing a rotor of an axial gap motor according to claim 4, wherein the laminated member includes main magnet inserting holes for respectively inserting the main magnets thereinto and rib storing holes for respectively storing the ribs thereinto, inner peripheral sides of the main magnet inserting holes and outer peripheral sides of the rib storing holes are respectively closed, the method further comprising:

forming the rotor frame including the plurality of ribs and the inner cylindrical portion, in the step of forming the rotor frame; and inserting the main magnets into the laminated member that is unified with the rotor frame.

10. An axial gap motor comprising:

a rotor rotatable around a rotational axis;

a stator disposed to be opposed to the rotor from at least one side in an axial direction of the rotor; and a shaft for transmitting power given from the rotor, wherein the rotor comprises:

a plurality of main magnets respectively magnetized in the axial direction and disposed at predetermined intervals in a peripheral direction of the rotor;

a plurality of yokes structured by a laminated member produced by winding a tape-shaped electromagnetic steel plate and respectively disposed on the main magnets on said at least one side in the axial direction; and a rotor frame comprising a plurality of ribs respectively interposed between the main magnets adjoining each other in the peripheral direction and extending in a radial direction and an inner cylindrical portion formed on a radially inner side of the ribs and connected to the shaft, the rotor frame being made of a die-cast alloy, wherein a connecting surface between the inner cylindrical portion of the rotor frame and the shaft comprises a concavo-convex shape, wherein the rotor further comprises a plurality of sub magnets respectively interposed between the yokes adjoining each other in the peripheral direction and respectively disposed in a plurality of sub magnet storing portions of the laminated member respectively formed inwardly of axial side surfaces of the yokes, the plurality of sub magnets respectively being magnetized in a direction perpendicular to the axial direction and the radial direction, and wherein the rotor frame further comprises sub magnet hold portions that respectively make contact with the sub magnets from sides of the axial side surfaces of the yokes.

11. The axial gap motor according to claim 10, wherein an outer peripheral portion of a flange has a substantially gear-like shape that is provided by said recessed portions and a plurality of arc surfaces respectively formed between said recessed portions adjoining each other, and the flange includes, in an intermediate portion thereof in the axial direction, a disk portion that partially forms the arc surfaces and has a plurality of partition walls for separating the recessed portions.

12. The axial gap motor according to claim 10, wherein a plurality of partition walls are respectively formed in a plurality of recessed portions in an intermediate portions thereof in the axial direction, and wherein the plurality of recessed portions are formed to be paired with each other on both sides in the axial direction, and each of the recessed portions is defined by a bottom wall, a pair of peripheral direction walls disposed opposed to each other in the peripheral direction of a flange, and the axial side surface of the partition wall.

13. The axial gap motor according to claim 12, wherein an outer peripheral surface of the flange includes, in the intermediate portion thereof in the axial direction, a circular recessed groove in communication with a shaft side axial hole, and the rotor frame has a circular projection that is in communication with the axial projection and enters into the recessed groove.

14. The axial gap motor according to claim 10, wherein the rotor further includes an outer ring including a ring side mounting hole extending in the radial direction and a hole diameter is larger on an outer peripheral side thereof than on an inner peripheral side thereof, and the rotor frame includes an outer cylindrical portion formed on a radially outer side of the ribs and an outward projection projected from an outer peripheral surface of the outer cylindrical portion and enters into the ring side mounting hole of the outer ring.

* * * * *